(12) United States Patent
Kahrs et al.

(10) Patent No.: US 9,934,269 B1
(45) Date of Patent: Apr. 3, 2018

(54) RESOURCE TAGGING AND GROUPING

(71) Applicant: Amazon Technologies, Inc., Seattle, WA (US)

(72) Inventors: Brian Kahrs, Seattle, WA (US); Shawn Galen Truesdell, Seattle, WA (US); Raleigh Harrison Upshur, Seattle, WA (US); Asa Denton, Seattle, WA (US); David Whitney, Seattle, WA (US); Donley Ray P'Simer, Seattle, WA (US); Craig Andrew Noeldner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 452 days.

(21) Appl. No.: 14/660,742

(22) Filed: Mar. 17, 2015

(51) Int. Cl.
*G06F 17/30* (2006.01)

(52) U.S. Cl.
CPC .. *G06F 17/30412* (2013.01); *G06F 17/30867* (2013.01)

(58) Field of Classification Search
USPC .................. 707/771, 758, 741; 709/226, 224
See application file for complete search history.

(56) References Cited

U.S. PATENT DOCUMENTS

| | | | |
|---|---|---|---|
| 8,990,398 B1 * | 3/2015 | Thrane | G06Q 10/0631 709/226 |
| 9,112,777 B1 * | 8/2015 | Barclay | H04L 41/0803 |
| 9,118,538 B1 | 8/2015 | Lekkalapudi et al. | |
| 9,275,408 B1 * | 3/2016 | King | G06F 21/33 |
| 9,444,819 B2 | 9/2016 | Muppidi et al. | |
| 9,524,167 B1 | 12/2016 | Cohn et al. | |
| 9,531,607 B1 | 12/2016 | Pai et al. | |
| 2002/0120741 A1 | 8/2002 | Webb et al. | |
| 2002/0152305 A1 | 10/2002 | Jackson et al. | |
| 2003/0046396 A1 | 3/2003 | Richter et al. | |

(Continued)

OTHER PUBLICATIONS

Office Action for U.S. Appl. No. 14/660,792, dated Jun. 15, 2017, Kahrs, entitled "Resource Tagging and Grouping," (12 pages).

(Continued)

*Primary Examiner* — Hung T Vy
(74) *Attorney, Agent, or Firm* — Lee & Hayes, PLLC

(57) ABSTRACT

Technologies are disclosed herein for resource tagging, grouping and associated functionality. A resource tagging service allows resource tags to be created and associated with computing resources in a service provider network. The resource tags can be utilized to search, collect, filter, organize and otherwise manage computing resources in the service provider network having matching tags, and/or to perform other types of functionality. A resource groups service allows customers and/or other users of the service provider network to view and access collections of computing resources that share common resource tags and/or other attributes. Resource groups can also be evaluated in order to identify computing resources in a service provider network for which certain types of actions or other functionality is to be performed. Membership of resource groups can also be evaluated over time and inferences can be drawn from the membership and from operational information associated with the member computing resources.

20 Claims, 21 Drawing Sheets

(56) References Cited

U.S. PATENT DOCUMENTS

| | | | |
|---|---|---|---|
| 2005/0091655 A1* | 4/2005 | Probert | G06F 8/62 |
| | | | 719/315 |
| 2005/0193427 A1 | 9/2005 | John | |
| 2011/0093457 A1 | 4/2011 | Kobayashi | |
| 2012/0209992 A1* | 8/2012 | Albaugh | G06Q 10/06316 |
| | | | 709/224 |
| 2015/0082432 A1 | 3/2015 | Eaton et al. | |
| 2015/0200941 A1 | 7/2015 | Muppidi et al. | |
| 2015/0350103 A1* | 12/2015 | Bertram | H04L 47/70 |
| | | | 709/226 |
| 2016/0182403 A1 | 6/2016 | Sarkar et al. | |
| 2016/0197880 A1 | 7/2016 | Korman et al. | |

OTHER PUBLICATIONS

Office Action for U.S. Appl. No. 14/660,665, dated Sep. 27, 2017, Kahrs, entitled "Resource Tagging and Grouping," 18 pages.
Office Action for U.S. Appl. No. 14/660,551, dated Sep. 8, 2017, Kahrs, entitled "Resource Tagging and Grouping," (23 pages).
Office Action for U.S. Appl. No. 14/660,665, dated Jun. 2, 2017, Kahrs, et al., entitled "Resource Tagging and Grouping," (18 pages).

* cited by examiner

CREATE A RESOURCE GROUP DEFINITION

A RESOURCE GROUP IS A COLLECTION OF RESOURCES THAT SHARE ONE OR MORE TAGS. USE THE FORM BELOW TO DEFINE A NEW RESOURCE GROUP DEFINITION.

GROUP NAME* [DATA RESOURCES] — 502
              504
TAGS* [COST CENTER ▽] [ANY TAG VALUE] — 506
      508 ⊕ ADD A TAG KEY

REGIONS* [ASIA PACIFIC ⊠] [EU (IRELAND) ⊠] — 510
         [U.S. EAST ⊠]

RESOURCE TYPES [VM INSTANCES ⊠] [LOAD BALANCERS ⊠] — 512

*REQUIRED        [PREVIEW]   [SAVE]
                   514         516

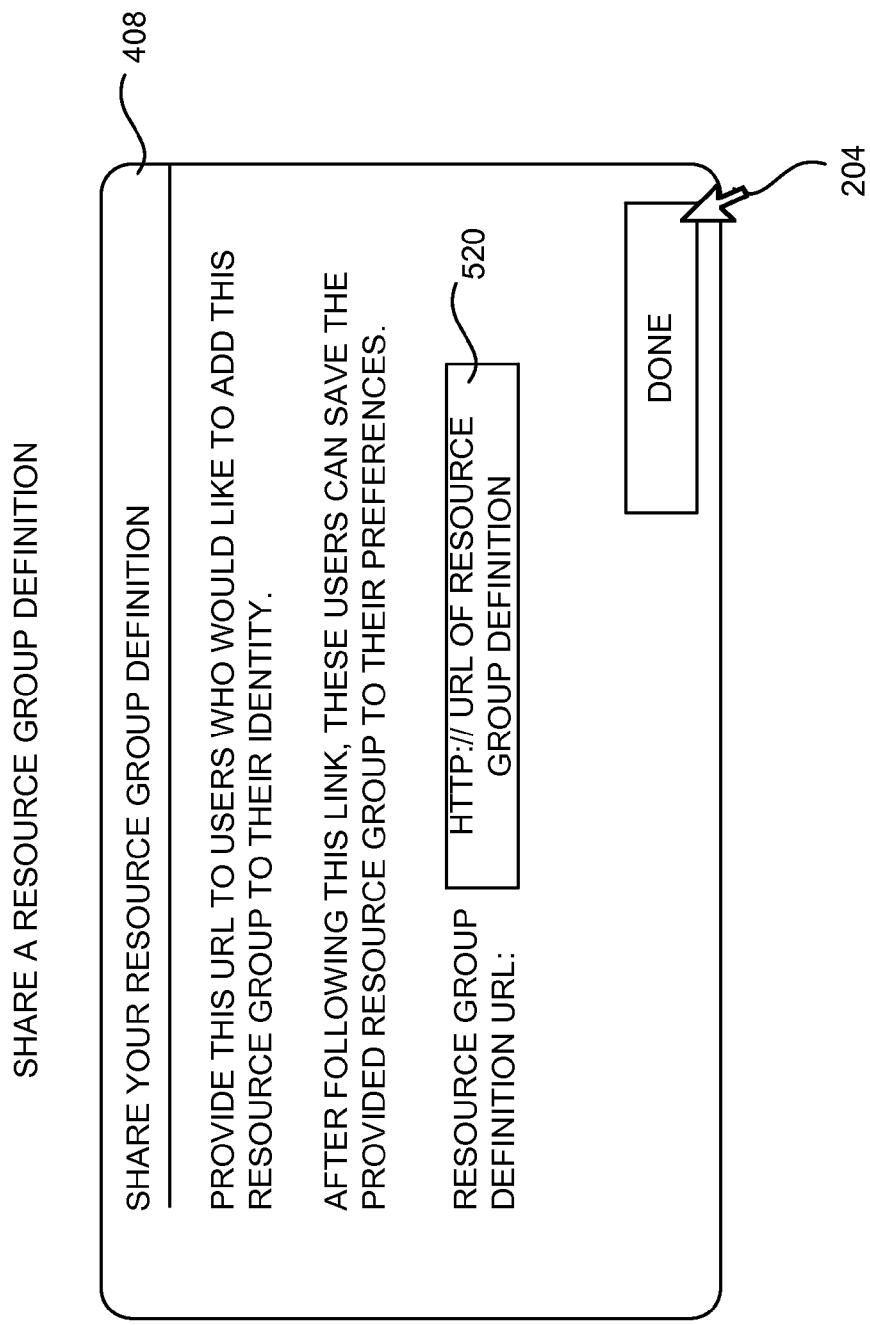

RESOURCE TAGGING AND GROUPING

BACKGROUND

Network-based service provider networks exist that allow customers to purchase and utilize various types of computing resources on a permanent or as-needed basis. For example, a service provider network may permit customers to purchase and utilize computing resources such as virtual machine instances, data storage resources, database resources, networking resources, network services, and other types of computing resources. Customers may configure the computing resources provided by a service provider network to implement desired functionality, such as to provide a network-based application or another type of functionality.

Managing computing resources provided by a service provider network such as those described above can be extremely complex. At least some of this complexity is attributable to the large number of computing resources that are commonly utilized at any given time by many customers of service provider networks. For example, some customers of service provider networks might utilize large numbers of computing resources that are provided by or associated with many different types of network services and that are provided by computing resources operating in multiple geographically dispersed data centers. When large numbers of computing resources such as these are utilized by a customer of a service provider network in this way, it can be very difficult for the customer to obtain information regarding the operational status of resources that together provide certain functionality or that are related in some way.

The disclosure made herein is presented with respect to these and other considerations.

BRIEF DESCRIPTION OF THE DRAWINGS

FIGS. 5A-5D are UI diagrams showing aspects of several illustrative UIs disclosed herein for creating a resource group definition, viewing resources in a resource group, viewing information about resources in a resource group, and sharing a resource group definition;

DETAILED DESCRIPTION

Figure 1:
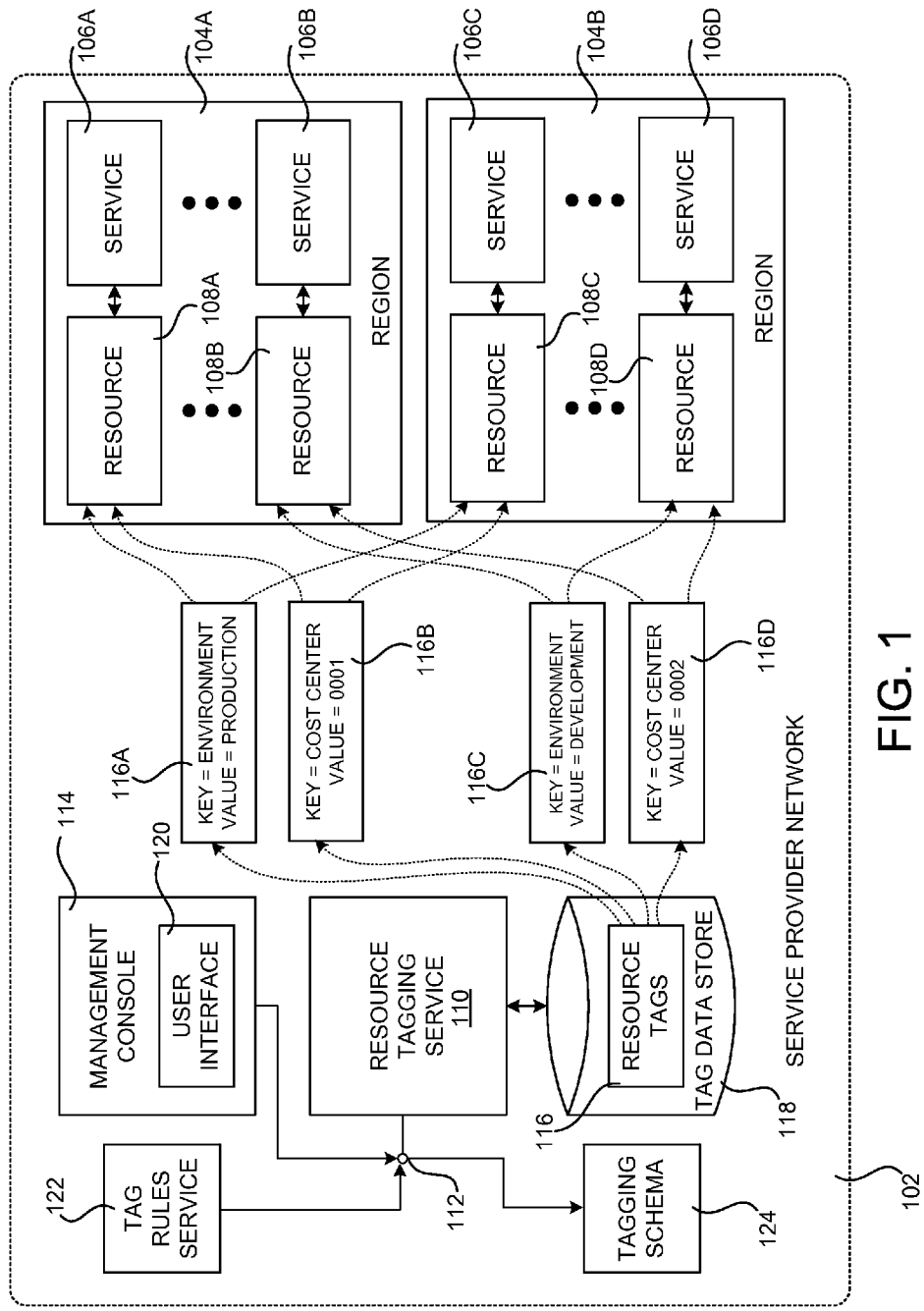
FIG. 1 is a system architecture diagram showing aspects of the configuration and operation of a service provider network that is configured to provide a resource tagging service.

The following detailed description is directed to technologies for providing a resource tagging service, a resource groups service, and related functionality. Utilizing an implementation of the technologies described herein, a resource tagging service can be provided that allows customers and/or other users of a service provider network to create and associate resource tags (which might be referred to herein simply as "tags") with computing resources in a service provider network. The computing resources may be provided by different services operating in different data centers, geographic regions, and/or availability zones. The resource tags can be utilized to collect, filter, and organize computing resources, to search for and view information about computing resources with matching tags, to manage computing resources with matching tags, and/or to perform other types of functionality. A tagging schema for tagging computing resources can also be exported and shared with other users of the service provider network via a marketplace and/or in another manner.

Utilizing an implementation of the technologies described herein, a resource groups service can also be provided that allows customers and/or other users of a service provider network to view and access collections of computing resources that share common resource tags and/or other attributes. In particular, a resource group definition can be created that defines a resource group that includes computing resources having specified resource tags and/or other attributes. The computing resources in a resource group may be provided by different network services, and may be located in different data centers, geographic regions, and/or availability zones. Resource group definitions can also be exported and shared with other users of the service provider network via a marketplace and/or in another manner.

Using the resource tagging service and the resource groups service, various types of functionality can be enabled. For example, and without limitation, resource groups can be evaluated in order to identify computing resources in a service provider network for which certain types of actions or other functionality is to be performed. For example, a resource group definition might be evaluated to identify a group of resources to which specified user access rights are to be applied. As another example, a resource group definition might be evaluated in order to identify a group of computing resources for which billing information is to be provided. As yet another example, a resource group definition might be evaluated in order to identify a group of computing resources to which certain configuration parameters are to be applied. A resource group definition might also be evaluated to identify a group of computing resources for which other types of actions are to be performed.

Using an implementation of the technologies disclosed herein, membership of a resource group might also be evaluated over time. Operational information and/or other types of metrics for the computing resources in the resource group might also be obtained and evaluated over time. Inferences can then be identified from the membership of the resource group over time and from the operational information and/or metrics for the computing resources in the resource group over time. Additional details regarding the various components and processes described briefly above for providing a resource tagging service, a resource groups service, and related functionality will be presented below with regard to FIGS. 1-12.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein may be practiced in distributed computing environments, such as a service provider network, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a system architecture diagram showing aspects of the configuration and operation of a service provider network 102 that is configured to provide a resource tagging service 110 in one particular configuration. The service provider network 102 is a distributed network through which customers and/or other users can utilize computing resources 108 (which may be referred to herein as "resources"), such as virtual machine instances and/or other types of computing resources 108, on a permanent or as-needed basis.

Each type or configuration of a computing resource 108 may be available from the service provider network 102 in different sizes. For example, a service provider might offer physical hosts, virtual machine instances or other types of data processing resources that are available for purchase and use that have many different configurations of processor capabilities, main memory, disk storage, and operating system. In this regard, it should be appreciated that the term "host" as used herein might also encompass other types of execution environments, such as software containers.

A service provider operating the service provider network 102 might also offer other types of resources 108 for purchase and use by customers. For example, a service provider might offer virtual or hardware devices, database resources and instances, file or block data storage resources, and/or networking resources, such as load balancing resources, domain name service ("DNS") resources, virtual private cloud ("VPC") resources, virtual local area network ("VLAN") resources, and/or other types of hardware and software computing resources 108 or services 106 on a permanent or as-needed basis. The resources 108 might also include, but are not limited to, virtual machine instances and images, security groups, option groups, gateways, option sets, network access control lists ("ACLs"), subnets, storage buckets, network interfaces, snapshots, spot market requests, and storage volumes.

The service provider operating the service provider network 102 might also charge a fee for utilization of the resources 108 to a customer that creates and uses the resources 108. The fee charged for a particular resource 108 might be based upon the type and/or configuration of the resource 108. For example, in the case of a data processing resource 108, like a virtual machine instance, the fee for use of the resource 108 might be charged based upon the amount of time the resource 108 is utilized. In the case of a data storage resource 108, the fee might be computed based upon the amount of data stored and/or the amount of data transferred into or out of the resource 108. The fees for other types of resources 108 might also be based upon other considerations. A service provider might also utilize various purchasing models to determine the amount to charge a customer for use of resources 108 provided by the service provider network 102.

The resources 108 described above may be provided in one particular implementation by one or more data centers operated by the service provider. As known to those skilled in the art, data centers are facilities utilized to house and operate computer systems and associated components. Data centers also typically include redundant and backup power, communications, cooling, and security systems. The data centers might be located in geographically disparate regions 104, and might also be connected to various other facilities, such as co-location facilities, and various wide area networks ("WANs"), such as the Internet.

As shown in FIG. 1, the resources 108 might be provided by various services 106. The services 106 might be operating in different data centers and/or located in different geographic regions 104. In the example shown in FIG. 1, for instance, the services 106A and 106B are operating in the region 104A and the services 106C and 106D are operating in the region 104B. The service 106A provides the resource 108A and the service 106B provides the resource 108B. The service 106C provides the resource 108C and the service 106D provides the resource 108D. In this regard, it should be appreciated that the configuration shown in FIG. 1 has been simplified for discussion purposes and that many more services 106, resources 108, and regions 104 may be utilized.

The resources 108 described briefly above might also be provisioned and de-provisioned as needed in an automated fashion. For example, the service provider network 102 might be configured to instantiate a new instance of a computing resource 108, such as a virtual machine instance, in response to an increase in demand for a network service or other condition. Other types of computing resources 108 might also be provisioned and de-provisioned in a similar manner. Services 106 in the service provider network 102 might also provide functionality for automatically scaling and/or de-scaling resources 108 based upon demand for the resources 108 and/or other factors.

A customer or potential customer of the service provider network 102 might utilize an appropriate computing system (not shown in FIG. 1) to communicate with the service provider network 102 over an appropriate data communications network (also not shown in FIG. 1). In this way, a customer of the service provider network 102 can configure various aspects of the operation of the computing resources 108 provided by the service provider network 102, or to otherwise control any computing resources 108 being utilized by the customer. For example, and without limitation, a computing system utilized by a customer of the service provider network 102 might be utilized to purchase computing resources 108 in the service provider network 102, to configure aspects of the operation of the computing resources 108 through a management console 114 or other type of interface, to access and utilize functionality provided by the resource tagging service 110 and the other services and systems described herein, and/or to perform other types of functionality with regard to the operation of the computing resources 108 provided by the service provider network 102.

A customer computing system might be any type of computing device capable of connecting to the service provider network 102 via a suitable data communications network such as, but not limited to, a laptop or desktop computer, a tablet computing device, a server computer, or a mobile telephone. Administrative users employed by the operator of the service provider network 102, such as administrators managing the operation of the service provider network 102, might also connect with, manage, and utilize resources 108 provided by the service provider network 102 in a similar fashion.

As discussed briefly above, the service provider network 102 might also be configured to provide various types of network services 106 for use internally and by customers. For example, and without limitation, the service provider network 102 may provide an on-demand computing service for providing physical or virtual machine hosts on-demand, a data storage service for storing data, a cryptography service, a notification service, an authentication service, a policy management service, a task service and, potentially, other types of network-accessible services 106. These and other services 106 and their associated resources 108 may be utilized together to implement various types of network-based applications in the service provider network 102. Additional details regarding one implementation of the service provider network 102 and the various types of network services 106 that might be provided by the service provider network 102 will be discussed below with regard to FIGS. 9-11.

As also shown in FIG. 1, the service provider network 102 is configured to provide a resource tagging service 110 in one configuration. As discussed briefly above, the resource tagging service 110 enables customers and/or other users of the service provider network 102 to create and associate resource tags 116 with computing resources 108 in the service provider network 102. The resource tags 116 can be utilized to collect, filter, and organize the computing resources 108, to search for and view information about computing resources 108 having matching tags 116, to manage computing resources 108 with matching tags 116, and/or to perform other types of functionality. A tagging schema 124 for tagging computing resources 108 in the service provider network 102 can also be exported and shared with other users of the service provider network 102 via a marketplace (not shown in FIG. 1) and/or in another manner. Additional details regarding this and other functionality will be provided below.

In one configuration, the resource tagging service 110 is implemented as a network service that executes on computing resources provided by the service provider network 102. The resource tagging service 110 is configured to provide a network service application programming interface ("API") 112 for managing resource tags 116. For example, and without limitation, the API 112 might expose methods for creating, updating, retrieving, and deleting resource tags 116 for resources 108 in the service provider network 102.

Other services executing in the service provider network 102 may call the methods exposed by the API 112 in order to manage the resource tags 116. For example, and without limitation, a management console 114 might be provided in one configuration that provides a graphical user interface ("GUI") 120 for creating, updating, deleting, and otherwise managing the resource tags 116 and for performing other types of functionality. The management console 114 may call the API 112 in order to implement the functionality provided through the GUI 120. Details regarding the operation of the management console 114 and the GUI 120 will be provided below with regard to FIGS. 2A-2D. As shown in FIG. 1, other services, such as the tag rules service 122, might also utilize the API 112. Details regarding the operation of the tag rules service 122 will be provided below.

In one configuration, the resource tags 116 are implemented as an alphanumeric tag key and an associated alphanumeric tag value that corresponds to the tag key. For instance, in the example shown in FIG. 1, a resource tag 116A has been associated with the resources 108A and 108C that includes a tag key of "environment." The tag value for the resource tag 116A has been specified as "production." In a similar fashion, a resource tag 116C has been specified for the resources 108B and 108D that specifies the same tag key (i.e. "environment"), but that defines the tag value as being "development." In this way, the resources 108A and 108C have been tagged as being a part of a production environment while the resources 108B and 108D have been tagged as being a part of a development environment.

In the example shown in FIG. 1, a resource tag 116B has also been associated with the resources 108A and 108C that specifies a tag key of "cost center" and a tag value of "0001." Similarly, a resource tag 116D has also been associated with the resources 108B and 108D that specifies the same tag key (i.e. "cost center"), but that specifies a tag value of "0002". In this way, the resources 108A and 108C have been tagged as being associated with cost center number 0001, while the resources 108B and 108D have been tagged as being associated with cost center number 0002. It should be appreciated that the example resource tags 116 shown in FIG. 1 are merely illustrative and that many more resource tags 116 might be defined in a similar manner for many more resources 108. It should also be appreciated that a single tag key might have multiple tag values.

As also shown in FIG. 1, the resource tagging service 110 might store the resource tags 116 in a resource tag data store 118. The resource tag data store 118 may be a database or other type of data store that can store data identifying the resources 108 along with the resource tags 116 associated with the resources 108. The resource tag data store 118 might be implemented by a storage service, a database service, or another service executing in the service provider network 102. As will be described in greater detail below, the resource tags 116 stored in the resource tag data store 118 can be utilized to search for resources 108 having certain resource tags 116 associated therewith, to group resources, to perform other actions with regard to groups of resources and to perform other functions.

As discussed briefly above, the API 112 may expose methods for creating resource tags 116, to retrieve resource tags 116, for searching for resources 108 that have certain resource tags 116 associated therewith, for updating resource tags 116, and for deleting resource tags 116. Typically, these operations are limited to the resources 108 that are associated with an identity or an account in the service provider network 102 from which the request is made. For example, a user of the service provider network 102 may have an account through which they have provisioned certain resources 108 in the service provider network 102. When the user utilizes the GUI 120 provided by the management console 114 to create, retrieve, update, delete or perform other operations relating to the resource tags 116, these operations will be limited to the resources 108 associated with the user account.

As a specific example, a user might utilize the GUI 120 to search for resources 108 associated with their account. The resource tagging service 110 might operate with other systems in the service provider network 102 to list the resources 108 associated with the user's account that also match the user's search query. The user may then utilize the GUI 120 to request to associate one or more resource tags 116 with the resources 108 identified by the search. In response to such a request, the management console 114 may call the API 112 exposed by the resource tagging service 110 to create the specified resource tags 116 in the resource tag data store 118. Additional details regarding this process will be provided below with regard to FIGS. 2A and 2B.

As another example, a user might utilize the GUI 120 provided by the management console 114 to search for resources 108 associated with their account that also have certain resource tags 116 associated therewith. In response to such a request, the management console 114 might call the API 112 to request that the resource tagging service 110 search the tag data store 118 for resources 108 having the specified resource tags 116 associated therewith. In response thereto, the resource tagging service 110 may return data that identifies the computing resources 108 that are associated with the user account and that have the associated resource tags 116 associated therewith. The resources 108 may then be identified in the GUI 120. In other examples, a user might utilize the management console 114 and the GUI 120 to request that resource tags 116 be updated or deleted. In response thereto, appropriate calls may be made to the API 112 and the specified resource tags 116 may be updated or deleted in the tag data store 118 as requested by the user.

It should be appreciated that the various methods described above as being exposed by the API 112 are merely illustrative and that other types of methods might be provided for creating, retrieving, modifying, deleting, searching, and otherwise operating on the resource tags 116. For example, and without limitation, in one configuration, the API 112 also provides functionality for exporting a tagging schema 124 that describes a schema for tagging resources 108 in the service provider network 102. The tagging schema 124 might be exported in an appropriate data interchange format (e.g. XML or JSON) in order to enabling sharing of the tagging schema 124 with other users of the service provider network. 102. For example, an electronic online marketplace (not shown in FIG. 1) might be provided through which users can purchase or otherwise obtain the tagging schema 124. The users can then utilize the tagging schema 124 to apply resource tags 116 to the resources 108 associated with their accounts with the service provider network 102. This may allow the resources 108 to be tagged in a consistent manner across multiple service provider network 102 accounts. The tagging schema 124 might also be shared among users of the service provider network 102 in other ways in other configurations.

It should also be appreciated that other services operating in the service provider network might also utilize the API 112 to create, retrieve, update, search, modify, delete, and/or perform other operations on resource tags 116 in the tag data store 118. For example, and without limitation, network services executing in the service provider network 102 might programmatically identify resource tags 116 that are to be associated with resources 108 in the service provider network. As one specific example, a tag rules service 122 is provided in one configuration. The tag rules service 122 may utilize user-defined rules to determine the resource tags 116 that are to be applied to resources 108 in the service provider network 102. A rule might specify, for instance, that a certain resource tag 116 is to be applied to a type of resource 108 depending upon the operational state of the resource 108, the configuration of the resource 108, the type of the resource 108, and/or other attributes of the resource 108. The tag rules service 122 might continually monitor the rules and call the API 112 to create resource tags 116 for resource 108 based upon the evaluation of the rules. The resources to which the tag rules service 122 applies resource tags might also be identified based upon the evaluation of a resource group definition in the manner described below.

Another service (not shown in FIG. 1), might be configured to instantiate resources 108 in the service provider network 102 based upon a template or another type of definition provided by a user of the service provider network 102. The service might also be configured to call the API 112 to create resource tags 116 for resources 102 that have been instantiated in this manner. In this way, the user of the service provider network 102 does not have to manually assign resource tags 102 to these resources using the management console 114 or in another manner. It should be appreciated that these examples are merely illustrative and that other services, systems, and/or components operating in the service provider network 102 might be configured to programmatically identify computing resources 108, to programmatically identify the resource tags 116 that are to be applied to the computing resources 108, and to call the API 112 to create, retrieve, update, and/or delete the resource tags 116 for these resources.

Figure 2A:
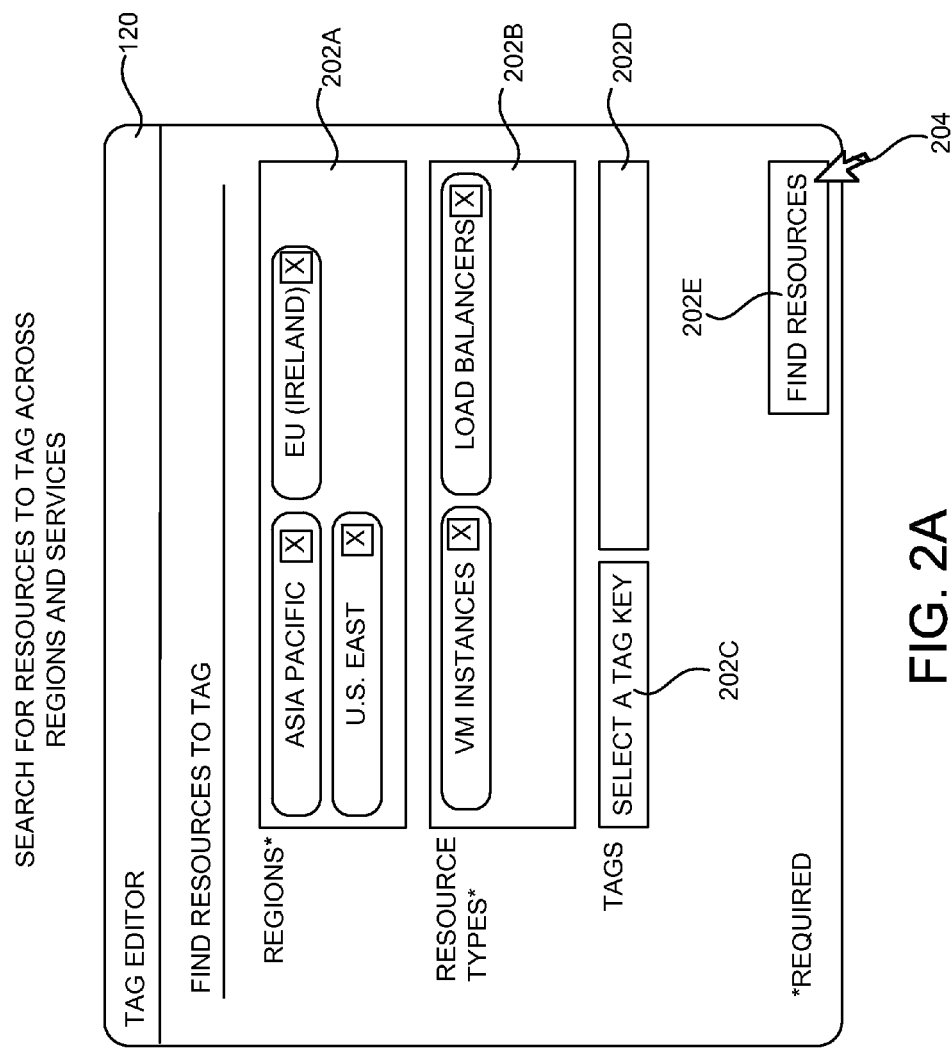
FIGS. 2A-2D are user interface ("UI") diagrams showing aspects of several illustrative UIs disclosed herein for searching for computing resources in a service provider network to tag, and for adding, editing and deleting resource tags that are associated with computing resources in a service provider network.

FIGS. 2A-2D are user interface ("UI") diagrams showing aspects of the GUI 120 provided by the management console 114 in one configuration for searching for computing resources 108 in a service provider network 102 to tag, and for adding, editing and deleting resource tags 116 that are associated with computing resources 108 in the service provider network 102. In particular, FIG. 2A shows an aspect of the GUI 120 for searching for resources 108 to tag with resource tags 116. As shown in FIG. 2A, the GUI 120 allows users of the service provider network 102 to search for resources 108 that are associated with their account. In particular, using the field 202A shown in FIG. 2A, a user can specify the geographic regions to which a search for resources 108 in the service provider network 102 is to be made. Using the field 202B, the user can also specify the resource types for which a search is to be made. In the example shown in FIG. 2A, for instance, a user has specified that a search be made for virtual machine instances and load balancers in the Asia Pacific, U.S. East, and Ireland regions of the service provider network 102.

In some configurations, the GUI 120 might also include fields 202D and 202E for specifying a tag key and a tag value. Resources 108 that have been previously tagged with resource tags 116 having matching tag keys and tag values will then be returned by the search. When the users selects the UI control 202E, such as with a mouse cursor 204, a search will be made for resources 108 in the matching regions, with the matching resource types, and with the matching resource tags 116, if specified. It should be appreciated that the management console 114 might call the resource tagging service 110 and/or other services in the service provider network 102 that maintain data regarding the resources 108 in the service provider network 102 that are associated with each account in order to perform the requested search.

In the example GUI 120 shown in FIG. 2A, the fields 202A and 202B are indicated as requiring tags. In these fields, if a user does not provide an input, the default value will be to select all of the regions (e.g. in the field 202A) or all resource types (e.g. in the field 202B). In this way, a user can utilize the GUI 120 to search for all of the resources of a specified type in a particular region, or regions, can search for specified resource types in all of the regions, and/or can search for all resource types in all regions. This mechanism might also be utilized with the GUIs shown in the other FIGS. presented herein, such as the GUI 408 shown in FIG. 5A.

Figure 2B:
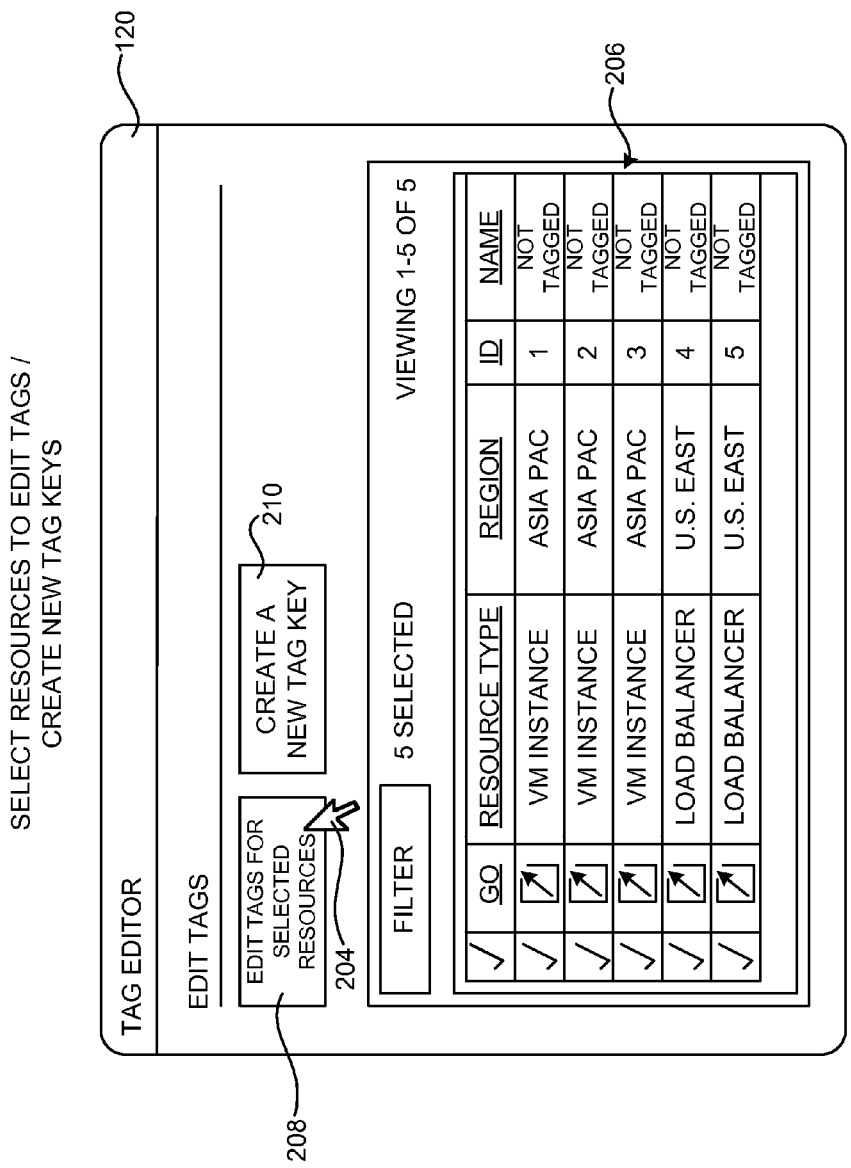

FIG. 2B shows another view of the GUI 120 that includes illustrative results for the search performed using the GUI 120 shown in FIG. 1. In particular, the GUI 120 shown in FIG. 2B includes a list 206 that identifies the computing resources 108 that were identified by the search. In this example, five resources 108 have been identified (i.e. two virtual machine instances and two loaded balancers). The list 206 also indicates the geographic region that each resource 108 is located in, the resource type, an identifier ("ID") for each resources, and a name associated with each resources. The list 206 also includes a UI control (e.g. a checkbox control) for allowing a user to select the resources 108 in the list 206. The resource tags 116 for the selected resources 108 can then be edited by selecting the UI control 208. Another UI control 210 might also be selected in order to create a new tag key. If a user selects the UI control 208, the GUI 120 shown in FIG. 2C will be presented in order to add and/or edit resource tags 116 for the resources 108 selected in the list 206.

Figure 2C:
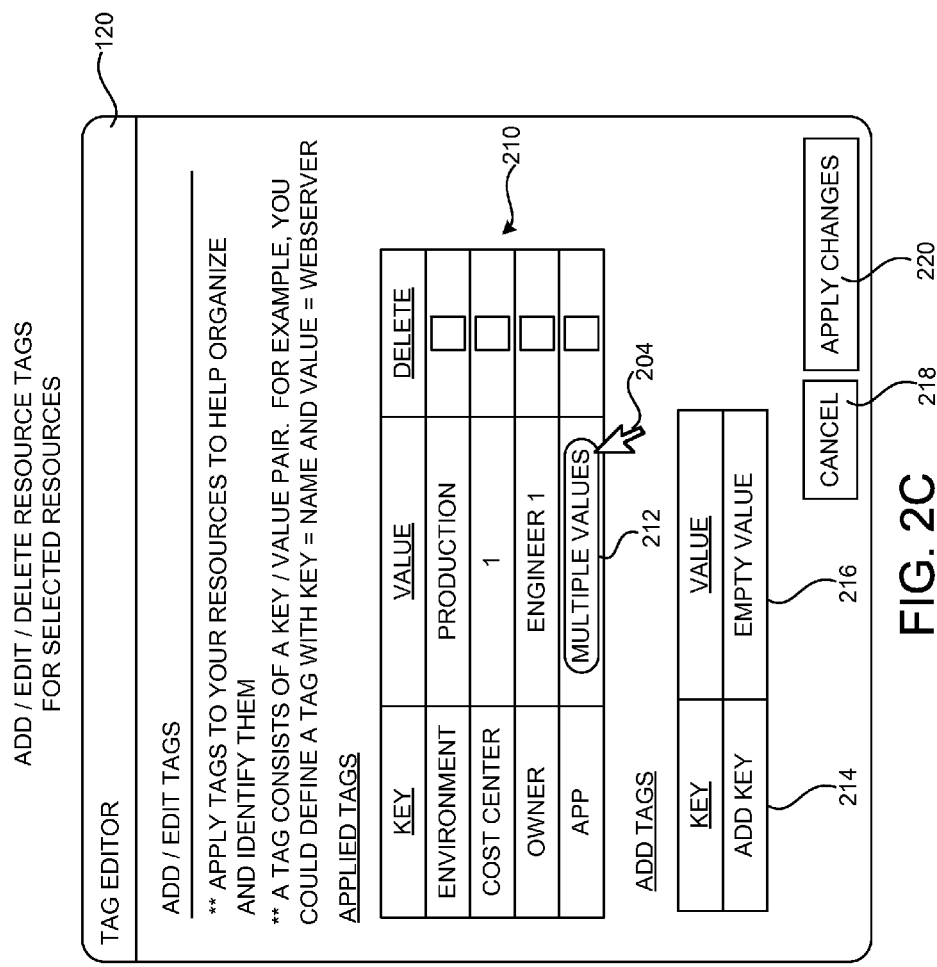

FIG. 2C shows an aspect of the GUI 120 for adding, editing, and/or deleting resource tags 116 for selected resources 108. As shown in FIG. 2C, a list 210 can be provided that shows the resource tags 116 currently associated with the resources 108. The list 210 can be used to edit or delete resource tags 116 for the resources 108. If a resource tag 116 has multiple tag values, a UI control 212 may be presented for the resource tag 116. If a mouse cursor 204 hovers over the UI control 212, the multiple values for the resource tag 116 may be displayed. The GUI 120 shown in FIG. 2C also includes fields 214 and 216 for associating new resource tags 116 with the selected resources 108.

Figure 2D:
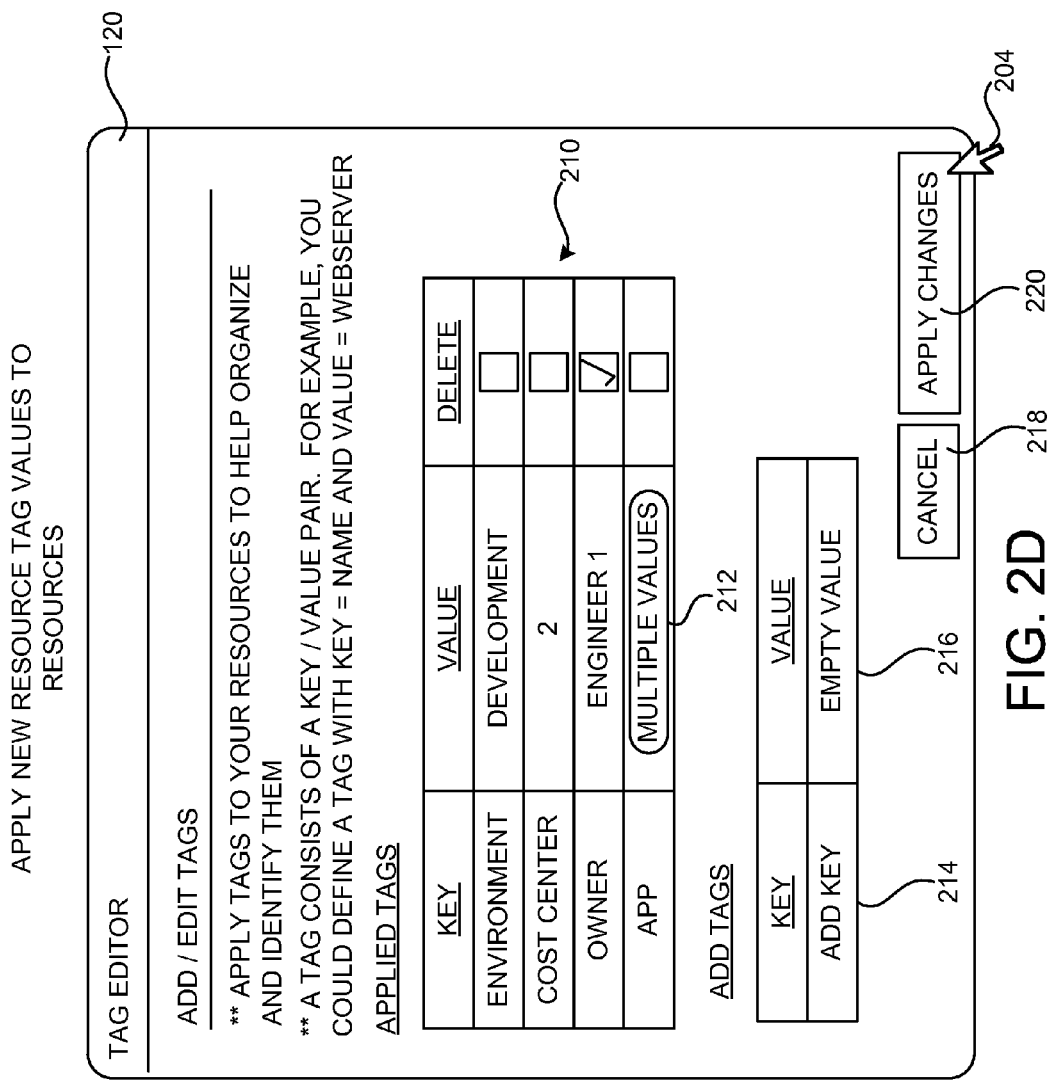

FIG. 2D shows the GUI 120 shown in FIG. 2C with several changes to the resource tags 116. In particular, in this example a user has changed the value for the "environment" tag key from "development" to "production" for the selected resources 108. The user has also changed the value for the "cost center" tag key from "2" to "1." The user has also indicated that the "owner" resource tag 116 is to be deleted from the selected resources 108. The user may then select the UI control 218 to cancel the specified changes or might select the UI control 220 to apply the changes. If the changes are to be applied, the management console 114 may call the API 112 in order to implement the added, changed, or deleted resource tags 116.

In some configurations, the GUI 120 also provides functionality for displaying system resource tags ("system tags"). System tags are resource tags that an operator of the service provider network 102 can apply to resources 108. System tags might be displayed to users of the service provider network, but the users cannot add or modify the system tags. Systems operating within the service provider network might automatically apply system tags to resources 108 and utilize the system tags for various purposes such as, but not limited, verifying the presence of a particular system tag prior to permitting a resource 108 to operate in the service provider network 102.

In some configurations, functionality might also be provided in conjunction with the GUI 120 shown in FIG. 2D (and the other GUIs disclosed herein) to verify that a user's changes are valid. For example, if a user provides too many tags or specifies other improper input values, a warning might be presented to the user. The user might also be prevented from selecting the UI control 220 to apply the changes. Other mechanisms might also be implemented in order to validate user input into the GUI 120.

It should be appreciated that the GUI 120 shown in FIGS. 2A-2D and described above (and the other GUIs described herein) are merely illustrative and that other configurations might be utilized. For example, and without limitation, other GUI controls and arrangements of those controls might be utilized. Additionally, more or less functionality than described herein might be provided. Other types of user interfaces might also be utilized for providing the functionality described herein.

Figure 3:
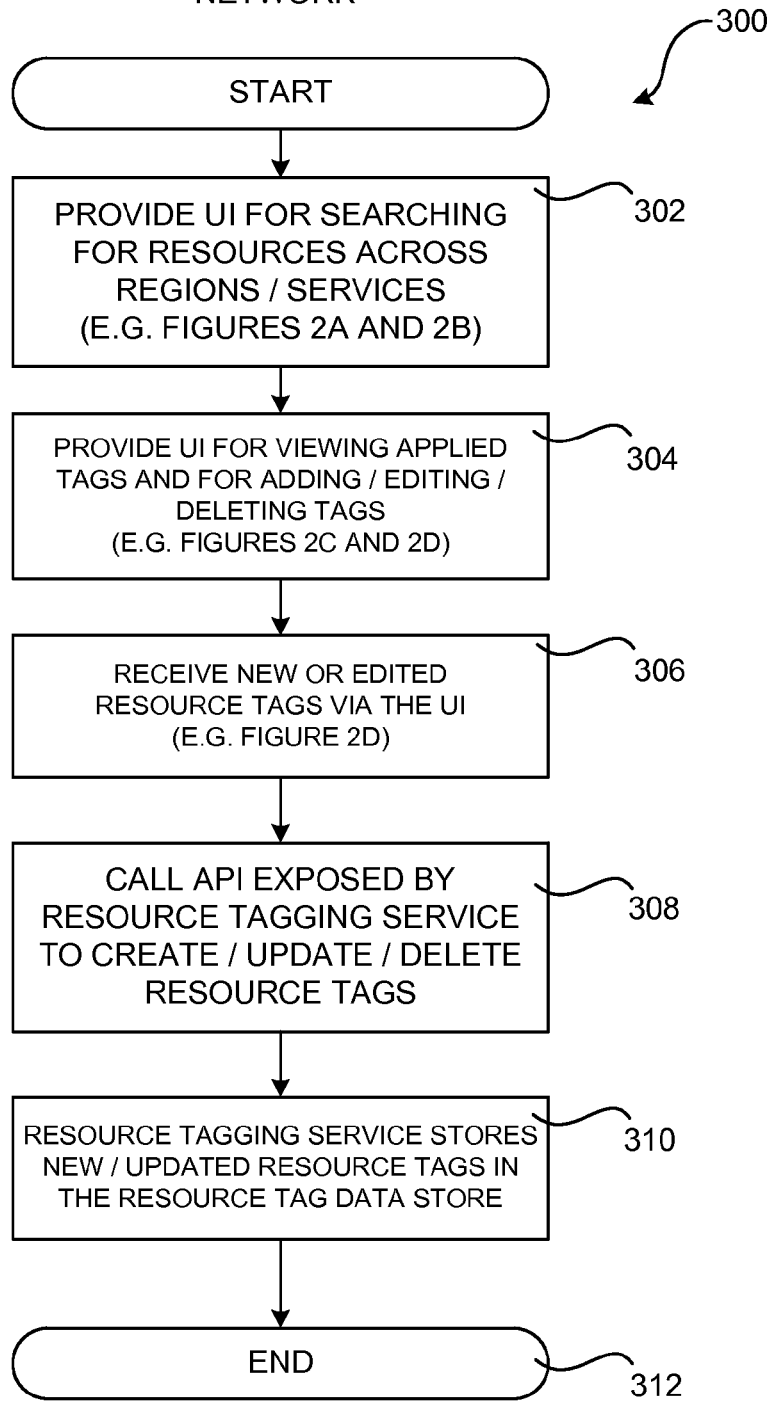
FIG. 3 is a flow diagram showing an illustrative routine for defining and/or editing resource tags that are associated with computing resources in a service provider network.

FIG. 3 is a flow diagram showing an illustrative routine 300 for defining and/or editing resource tags 116 that are associated with computing resources 108 in a service provider network 102. It should be appreciated that the logical operations described herein with respect to FIG. 3, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. Some or all of these operations might also be performed by components other than those specifically identified.

The routine 300 begins at operation 302, where a user interface, such as the GUI 120 shown in FIGS. 2A and 2B, may be provided for searching for resources 108 in the service provider network 102 that are associated with a user account. As discussed above, a search may be made for resources 108 in the service provider network 102 that are provided by different types of services 106 and that are located in different geographic regions. A list 206 of the matching resources 108 might also be returned in response to the search request.

From operation 302, the routine 300 proceeds to operation 304, where a user interface, such as the GUI 120 shown in FIGS. 2C and 2D, may be provided for viewing the resource tags 116 that have been applied to the resources 108 located during the search, and for adding, editing, and/or deleting resource tags 116 for the resources 108. New and/or edited resource tags 116 for the resources 116 might then be received via the provided user interface (as shown in FIG. 2D, for example) at operation 306.

From operation 306, the routine 300 proceeds to operation 308, where the management console 114 might call the API 112 in order to implement the updated, changed, and/or deleted resource tags 116 for the selected resources 108. In response thereto, the resource tagging service 110 updates the tag data store 118 to reflect the added and/or changed resource tags 116. The routine 300 then proceeds from operation 310 to operation 312, where it ends.

Figure 4:
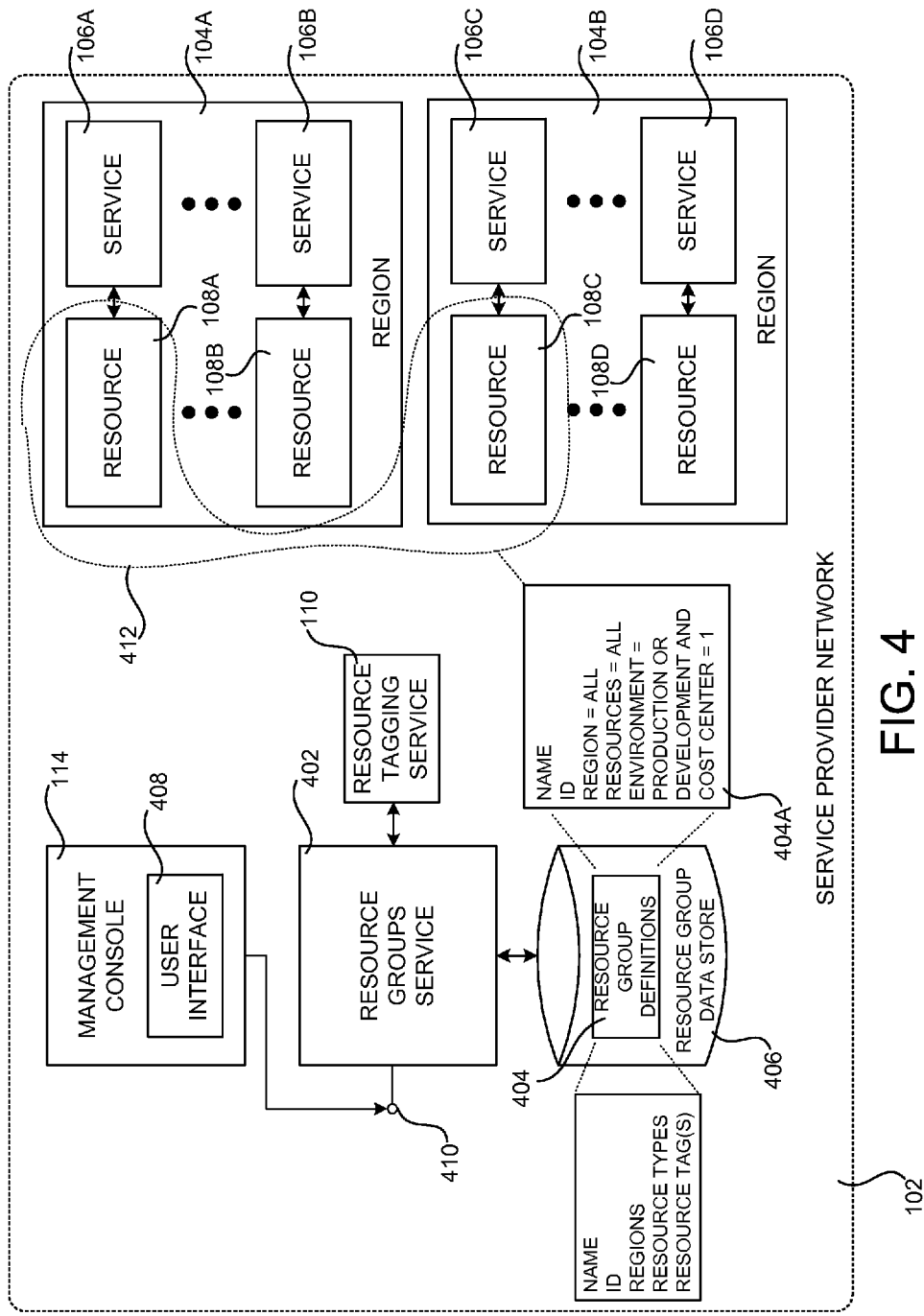
FIG. 4 is a system architecture diagram showing aspects of the configuration and operation of a service provider network that is configured to provide a resource groups service.

FIG. 4 is a system architecture diagram showing aspects of the configuration and operation of a service provider network 102 that is configured to provide a resource groups service 402. As described briefly above, the resource groups service 402 allows customers and/or other users of the service provider network 102 to view and access information for collections of computing resources 108 (i.e. groups) that share common resource tags 116 and/or other attributes. Other types of functionality might also be implemented based upon the membership of a resource group.

In order to enable this functionality, the resource groups service 402 provides functionality for creating and managing resource group definitions 404. The resource group definitions 404 define a group of computing resources 108 (i.e. a "resource group") having specified resource tags 116 and/or other attributes. For example, in one particular implementation, a resource group definition 404 identifies one or more resource tags 116. The resource tags 116 for the resources 108 in a resource group might be specified as a logical expression. For example, and without limitation, the resource tags 116 might be specified using various combinations of Boolean (AND, OR, NOT, etc.) operators. Other types of operators might also be specified, such as wildcards. Resources 108 matching the resource tags 116 specified in the resource group definition 116 (or an expression) at the time the resource group definition 404 is evaluated are considered to be a part of the resource group.

As shown in FIG. 4, a resource group definition 404 might also specify one or more resource types or geographic regions. Only resources 108 of the specified resource type and/or within the specified geographic region at the time the resource group definition 404 is evaluated will be considered to be a part of the resource group. As also shown in FIG. 4, a resource group definition 404 might also include a name and a unique ID. A resource group definition 404 might also include additional information not specifically shown in FIG. 4 or described herein. The resource group definitions 404 might be stored in a resource group data store 406. The resource group data store 406 might be implemented as a database or in another manner.

It should be appreciated that a resource group definition 404 might also specify other requirements for resources to be considered a part of a resource group. For example, and without limitation, a resource group definition 404 might specify other attributes that a resource 108 must have in order to be a part of a resource group, such as configuration attributes. It should also be appreciated that, in some configurations, resource group definitions 404 might also have permissions associated therewith. In this way, different users might be provided different access rights to the resource group definition 404. For example, one user might be permitted to view and/or evaluate the resource group definition 404 but not to edit the resource group definition 404. Another user might be provided with rights to edit the resource group definition 404. Other types of permissions might also be specified. A resource group definition 404 might also have one or more resource tags associated with it in the manner described herein.

As also shown in FIG. 4, the resource groups service 402 might expose an API 410 for performing various types of functionality. For example, and without limitation, the API 410 might include methods for creating, editing or deleting resource group definitions 404. The API 410 might also include a method for exporting resource group definitions 404. In this way, the resource group definitions 404 can be shared with other users of the service provider network 102 via a marketplace and/or in another manner. Other mechanisms might also be utilized to enable sharing of resource group definitions 404.

The API 410 might also include a method for evaluating a resource group definition 404. When a request is received to evaluate a resource group definition, the resource groups service 402 is configured to identify those resources 108 in the service provider network 102 that have associated resource tags 116 that match the resource tags 116 in the resource group definition 404. If the resource group definition 404 specifies resource types or regions, then only resources 108 of the specified type(s) and in the specified region(s) will be considered to be members of the resource group. The resource groups service 402 might utilize the API 112 provided by the resource tagging service 110 to identify the resources 108 in a resource group. Other services might also be consulted to identify the matching resources. Matching resources 108 may also be limited to resources 108 associated with the identity and/or account making the request.

In the example shown in FIG. 4 (which assumes the resource tags 116 from the example shown in FIG. 1), for instance, a resource group definition 404A has been created that specifies the following resource tags 116: "environment=production" and "cost center=1." The resource group definition 404A also specifies that all resource types and resources in all geographic regions are to be returned. Evaluation of the resource group definition 404A in this example returns data identifying a resource group 412 that includes the resources 108A and 108C. In this example, the resources 108A and 108C are also provided by different services 106A and 106C, respectively, that operate in different geographic regions 104A and 104B. In this regard, it should be appreciated that that the computing resources 108 in a resource group may be provided by different network services 106, and may be located in different data centers, geographic regions 104, and/or availability zone.

It should also be appreciated that the membership of a resource group can change over time. In particular, the members of a resource group are those resources 106 that match the resource group definition 106 at the point in time at which it is evaluated. When the resource group definition 106 is evaluated at another point in time, the associated resource group might include different member resources 106. It should also be appreciated that resource group definitions 106 and resource groups themselves might be considered resources 106 and have resource tags 116 associated therewith.

As also shown in FIG. 4, the management console 114 might also provide a GUI 408 through which a user can create, manage, view, and otherwise operate on resource group definitions 404 and their associated resource groups. The GUI 408 can also provide operational information regarding the resources 108 in a resource group. In order to implement the functionality provided by the GUI 408, the management console 114 might utilize the various methods exposed by the resource groups service 402 through the API 410. The management console 114 might also utilize the API 112 provided by the resource tagging service 110. The management console 114 might also utilize functionality provided by other services 106 operating in the service provider network. Additional details regarding the GUI 408 will be provided below with regard to FIGS. 5A-5D.

In some configurations, the results of the evaluation of a resource group definition 404 might be utilized to create a template that can be consumed by a service in the service provider network 102 that instantiates new resources 108. For example, and without limitation, the results of the evaluation of a resource group definition 404 might indicate that the corresponding resource group includes four virtual machine instances having a particular configuration. In this example, a template maybe created for consumption by another service in the service provider network 102 that will permit the service to create new instances of the four virtual machine instances having the same configuration. The template might also identify other types of resources 108 in a similar manner.

Figure 5B:
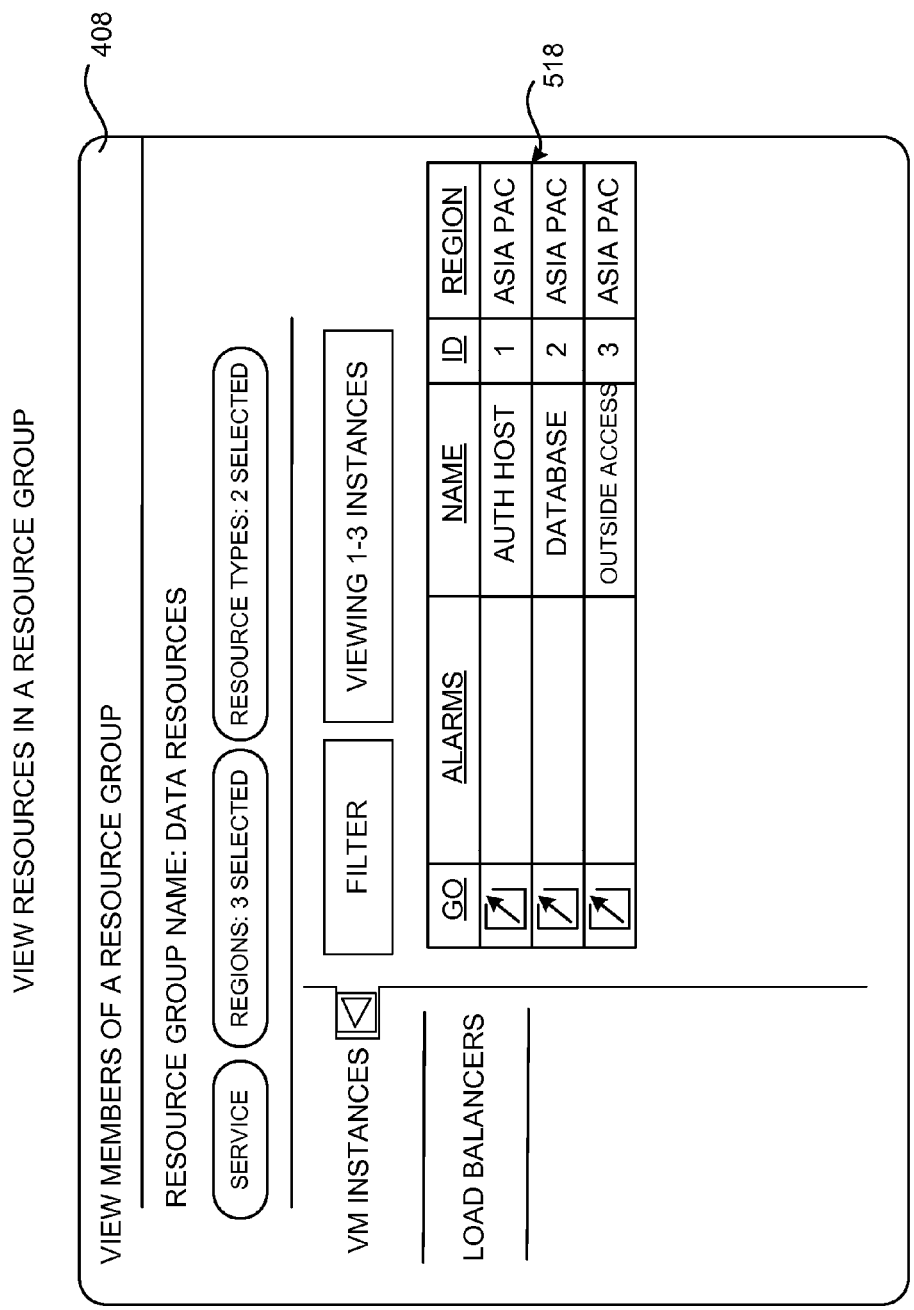

FIGS. 5A-5D are user interface diagrams showing aspects of the GUI 408 provided by the management console 114 for performing various functions relating to the resource group definitions 404. In particular, FIG. 5A shows aspects of the GUI 408 for creating a new resource group definition 404. As shown in FIG. 5A, the GUI 408 might include a field 502 for specifying the name of a new resource group definition 404. The GUI 408 might also include fields 504 and 506 for specifying a tag key and a tag value for resources 108 in the service provider network 102. A UI control 508 might also be provided for adding additional resource tags 116.

As discussed above, a resource group definition 404 might also specify one or more geographic regions and/or one or more resource types. In order to define the regions and resource types for the resource group definition 404, if any, the GUI 408 might include the fields 510 and 512 in one configuration. The field 510 might be utilized to specify one or more geographic regions in the service provider network 102 and the field 512 might be utilized to specify the resource types.

The GUI 408 might also include a UI control 514 which, when selected, will present a preview of the resources 108 in the resource group defined in the GUI 408. An example of such a preview will be described below with regard to FIG. 5B. A UI control 516 might also be provided which, when selected, will cause the specified resource group definition 404 to be saved. In order to implement this functionality, an appropriate call may be made to the API 410 exposed by the resource groups service 410. The resource groups service 410 may then save the resource group definition 404 in the resource group data store 406.

FIG. 5B shows aspects of the GUI 408 for viewing the resources 108 in a resource group. As discussed above with regard to FIG. 5A, the GUI 408 shown in FIG. 5B might be presented in response to the selection of the UI control 514 so that a user might view a preview of the membership of a resource group. As shown in FIG. 5B, the preview might include a list 518 of the resources 106 in the defined resource group. The list 518 might also include other information, such as operational information for the resources 106, the name of the resources 106 in the resource group, the ID of the resources, and the region in which the resources 106 are located. The operational information for the resources 106 might include an indication as to whether any alarm conditions exist on the resources 106. As will be discussed below with regard to FIG. 5C, other types of operational information might also be provided for the resources 106 in a resource group.

Figure 5C:
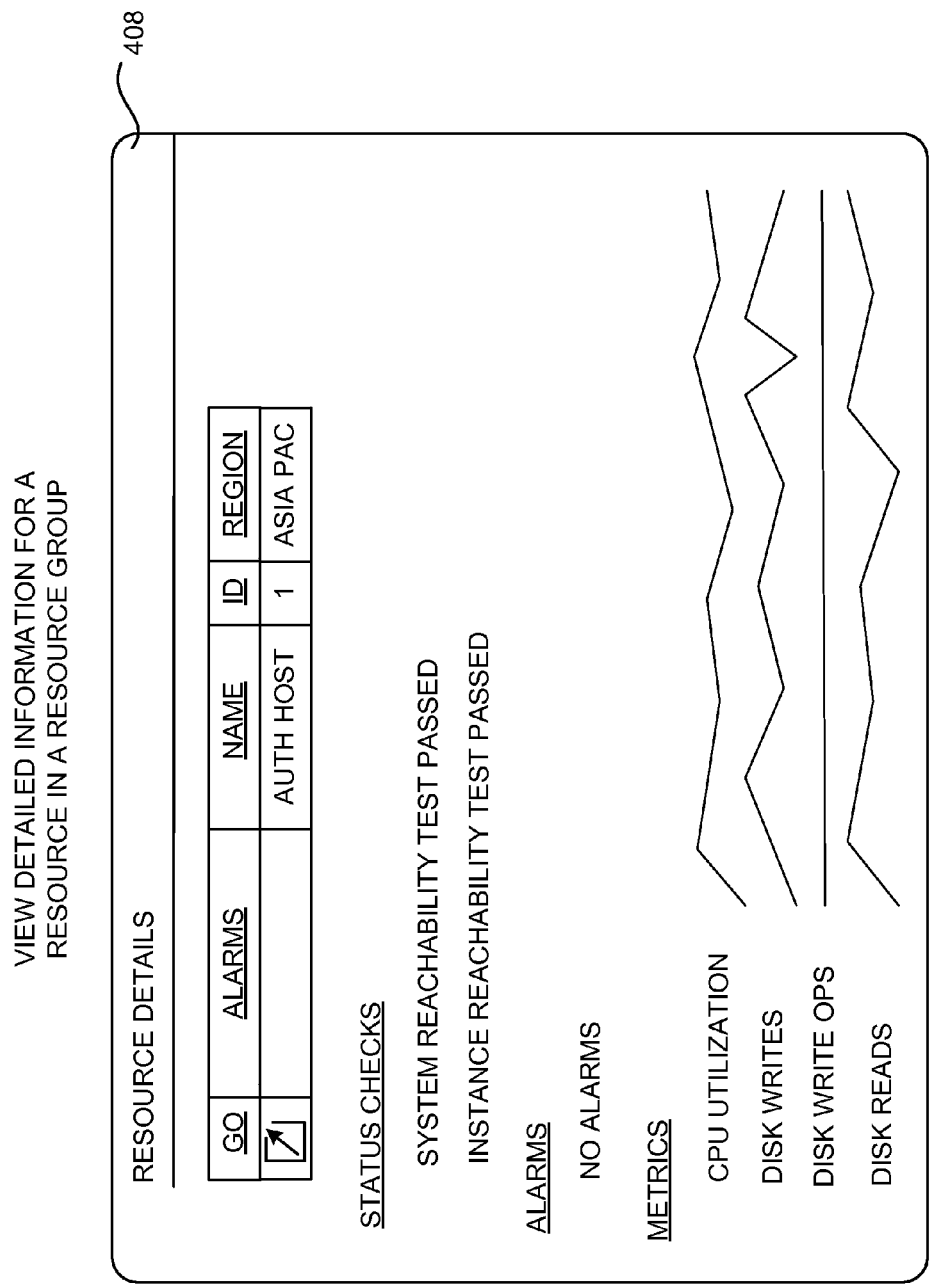

FIG. 5C shows aspects of the GUI 404 for viewing information about resources 108 in a resource group. As shown in FIG. 5C, the GUI 408 might also provide functionality for providing various types of operational information about the resources 106 in a resource group. In order to present this information, the resource groups service 402 may evaluate the membership of a resource group using the associated resource group definition 404. Once the membership has been identified, the management console 114 might obtain the operational information for the member resources 106 from various services executing in the service provider network 102 and/or from the resources 106 themselves. The operational information might then be presented in the GUI 408 or in another manner.

As shown in FIG. 5C, the operational information might include information regarding the results of status checks for the resources 106 in a resource group, alarm conditions associated with the resources 106 in a resource group, and operational metrics for the resources 106 in a resource group over time. Other types of information regarding the configuration, operational, and status of resources 106 in a resource group can also be obtained and provided through the GUI 408, the API 410, and/or in another manner.

FIG. 5D shows aspects of the GUI 404 for sharing a resource group definition 404. As shown in FIG. 5D, the GUI 408 might also provide functionality for sharing of resource group definitions 404 with other users of the service provider network 102. In the specific implementation shown in FIG. 5D, a uniform resource locator ("URL") is provided that can be shared with outer users of the service provider network 102. After following the URL, a user can save the referenced resource group definition 404 to their account and use the resource group definition 404 in the manner described above. It should be appreciated that other mechanisms might also be utilized to export and share the resource group definitions 404 among users of the service provider network 102. In some configurations, an electronic marketplace (not shown in FIG. 5D) is also provided through which users can sell their resource group definitions 404. Other mechanisms might also be utilized.

Figure 6:
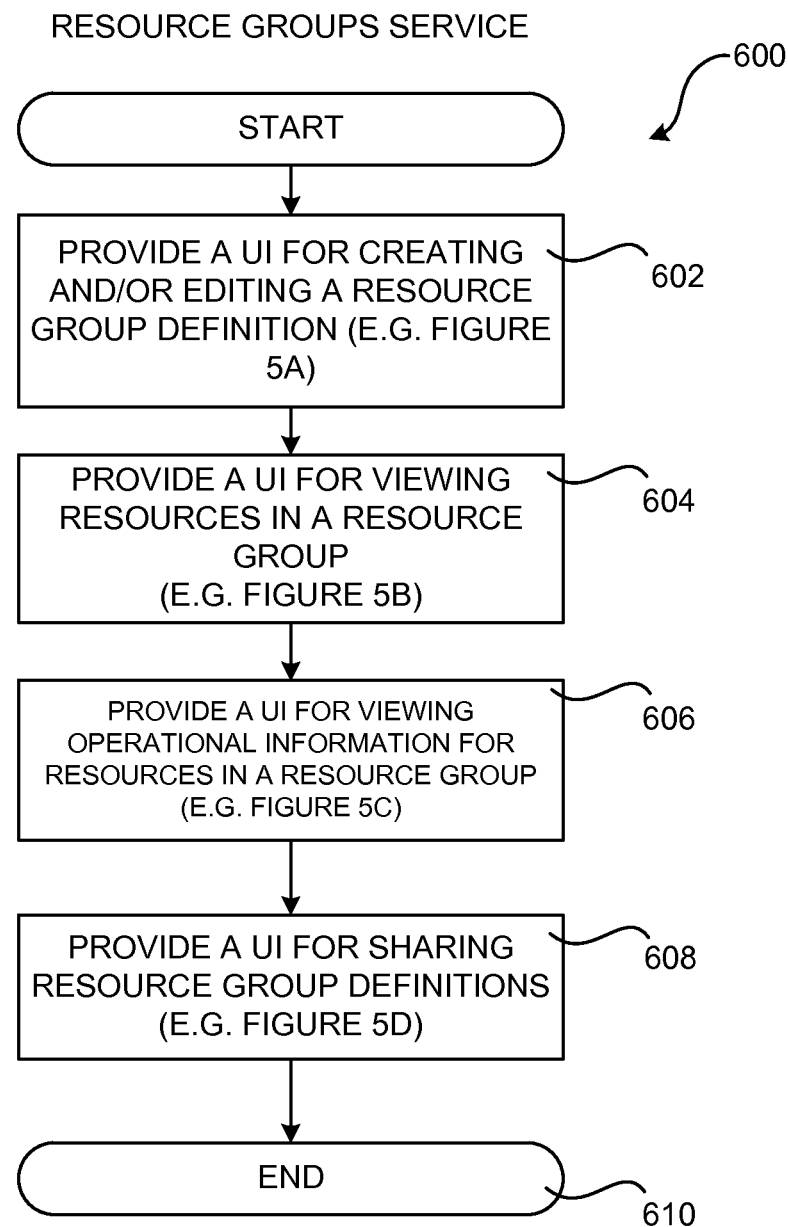
FIG. 6 is a flow diagram showing an illustrative routine for providing a resource groups service, according to one configuration disclosed herein.

FIG. 6 is a flow diagram showing an illustrative routine 600 for providing the resource groups service 402, according to one configuration disclosed herein. The routine 600 begins at operation 602, where a UI might be provided for creating and/or editing a resource group definition 404. One such GUI 408 was discussed above with regard to FIG. 5A. As also discussed above, the API 410 exposed by the resource groups service 410, the resource tagging service 110, and/or other services operating in the service provider network 102 might be utilized in order to provide the functionality enabled through the GUI 408.

From operation 602, the routine 600 proceeds to operation 604, where a UI might be provided for viewing the resources 106 in a resource group. One such GUI 408 was discussed above with regard to FIG. 5B. As also discussed above with regard to FIG. 5B, the API 410 exposed by the resource groups service 410, the resource tagging service 110, and/or other services operating in the service provider network 102 might be utilized in order to evaluate a resource group definition 404 in order to determine the membership of a resource group.

From operation 604, the routine 600 proceeds to operation 606, where a UI might be provided for viewing the resources 106 in a resource group. One such GUI 408 was discussed above with regard to FIG. 5C. As also discussed above with regard to FIG. 5C, the API 410 exposed by the resource groups service 410, the resource tagging service 110, other services operating in the service provider network 102, and/or the actual resources 106 might be utilized in order to obtain the operational information for the resources 106 in a resource group.

From operation 606, the routine 600 proceeds to operation 608, where a UI may be presented for sharing resource group definitions 404. One such GUI 408 was discussed above with regard to FIG. 5D. Other types of UIs, APIs, and other mechanisms might also be provided to enable the sharing of resource group definitions 404. As discussed above, an electronic marketplace might also be provided for sharing, exchanging, and/or selling resource group definitions. The routine 600 then proceeds from operation 608 to operation 610, where it ends.

Using the resource tagging service 110 and the resource groups service 402, various types of functionality can be enabled. For example, and without limitation, resource groups can be evaluated in order to identify computing resources 108 in the service provider network 102 for which certain types of operations or other functionality is to be performed. For example, a resource group definition 404 might be evaluated to identify a group of resources 108 to which specified user access rights are to be applied. As another example, a resource group definition 404 might be evaluated in order to identify a group of computing resources 108 for which billing information is to be provided. As yet another example, a resource group definition 404 might be evaluated in order to identify a group of computing resources 108 to which certain configuration parameters are to be applied. A resource group definition 404 might also be evaluated to identify a group of computing resources 108 for which other types of operations are to be performed. Additional details regarding these configurations will be provided below with regard to FIGS. 7A-7C.

Figure 7A:
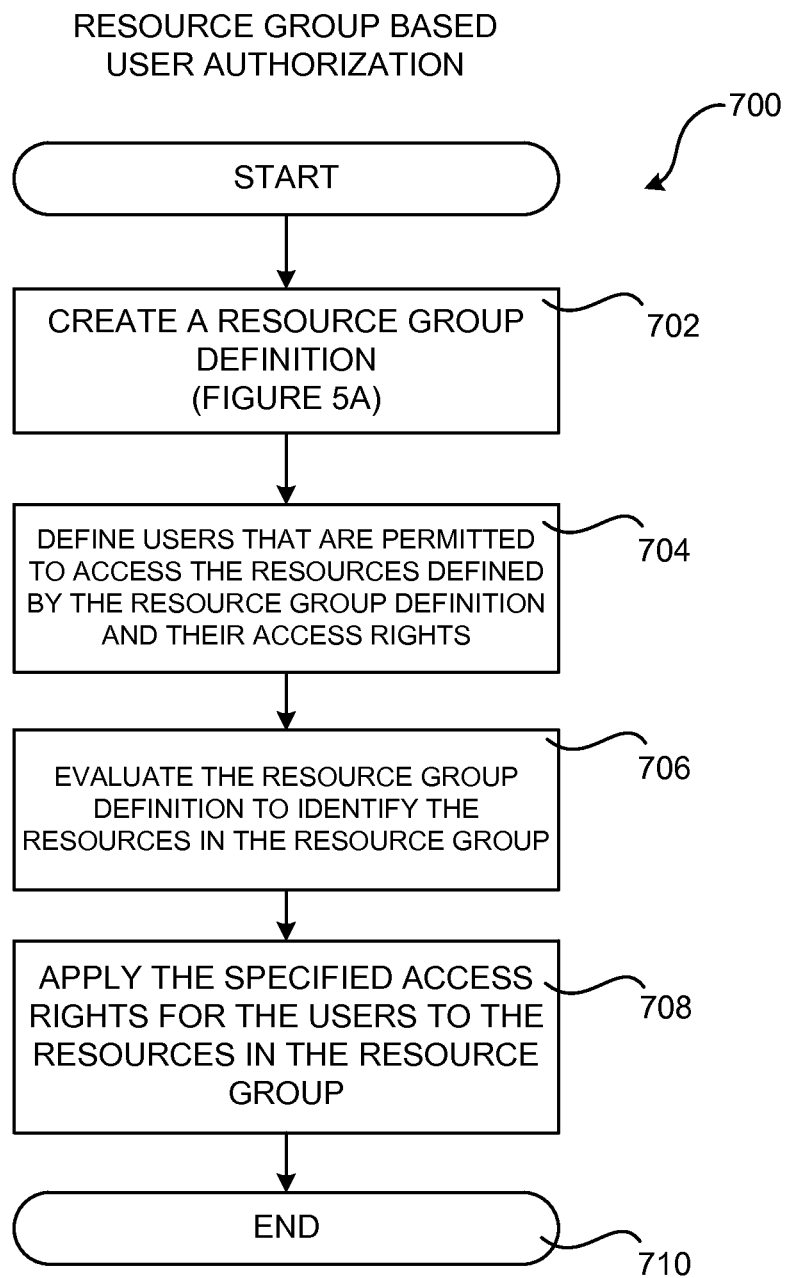
FIGS. 7A-7C are flow diagrams showing illustrative routines for resource group based user authorization, resource group based provision of billing information, and resource group based configuration of resources, respectively.
Figure 7A:
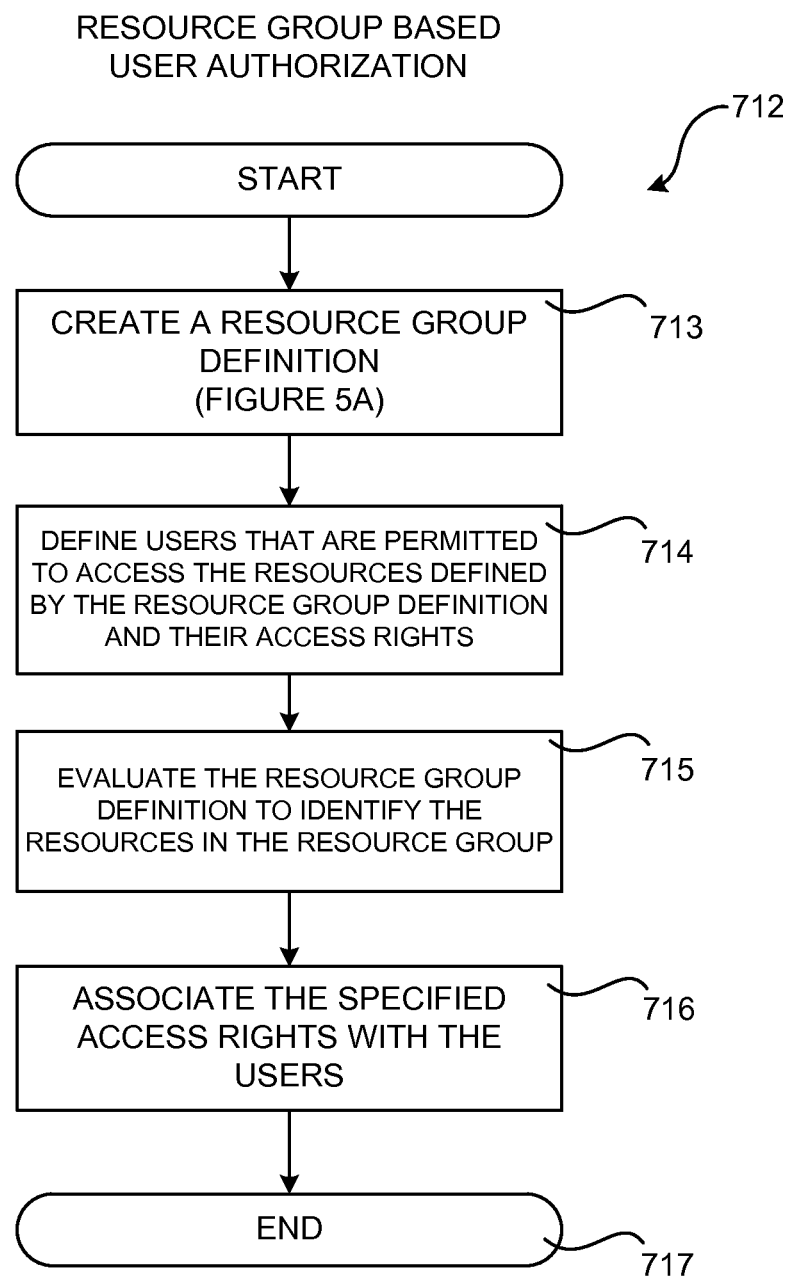

FIG. 7A is a flow diagram showing an illustrative routine 700 for resource group based user authorization. The routine 700 begins at operation 702, where a resource group definition 404 might be created using the GUI 408 in the manner described above. Other mechanisms, such as the API 410, might also be utilized to create a new resource group definition 404 and to store the resource group definition 404 in the resource group data store 406.

From operation 702, the routine 700 proceeds to operation 704, where an appropriate GUI or another mechanism might be utilized to specify one or more users that are authorized to access the resources 108 in the resource group defined by the resource group definition 404 created at operation 702. This might include, for example, specifying the particular access rights to the resources 108 in the resource group for each user.

From operation 704, the routine 700 proceeds to operation 706, where the resource group definition 404 is evaluated in the manner described above in order to identify the specific resources 108 that are in the resource group represented by the resource group definition 404. Once the members of the resource group have been identified, the routine 700 proceeds to operation 708, where the access rights specified at operation 704 are applied to the computing resources 108 in the resource group. Various systems operating within the service provider network 102 may be called in order to assign the specified access rights to the computing resources 108 in the resource group. The routine 700 then proceeds from operation 708 to operation 710, where it ends.

FIG. 7AA is a flow diagram showing another illustrative routine 712 for resource group based user authorization. In the routine 712, the operations 713, 714, and 175 are the same as operations 702, 704, and 706 described above with regard to FIG. 7A. However, in the routine 712, access rights for the resources 108 in a resource group are applied to a user rather than to a resource 108. This occurs at operation 716. In this way, when a request to access a particular resource 108 is received, the access rights of the user requesting access are evaluated rather than access rights that have been set on the resource 108 as in the routine 700 discussed above with regard to FIG. 7A. From operation 716, the routine 712 proceeds to operation 717, where it ends.

Figure 7B:
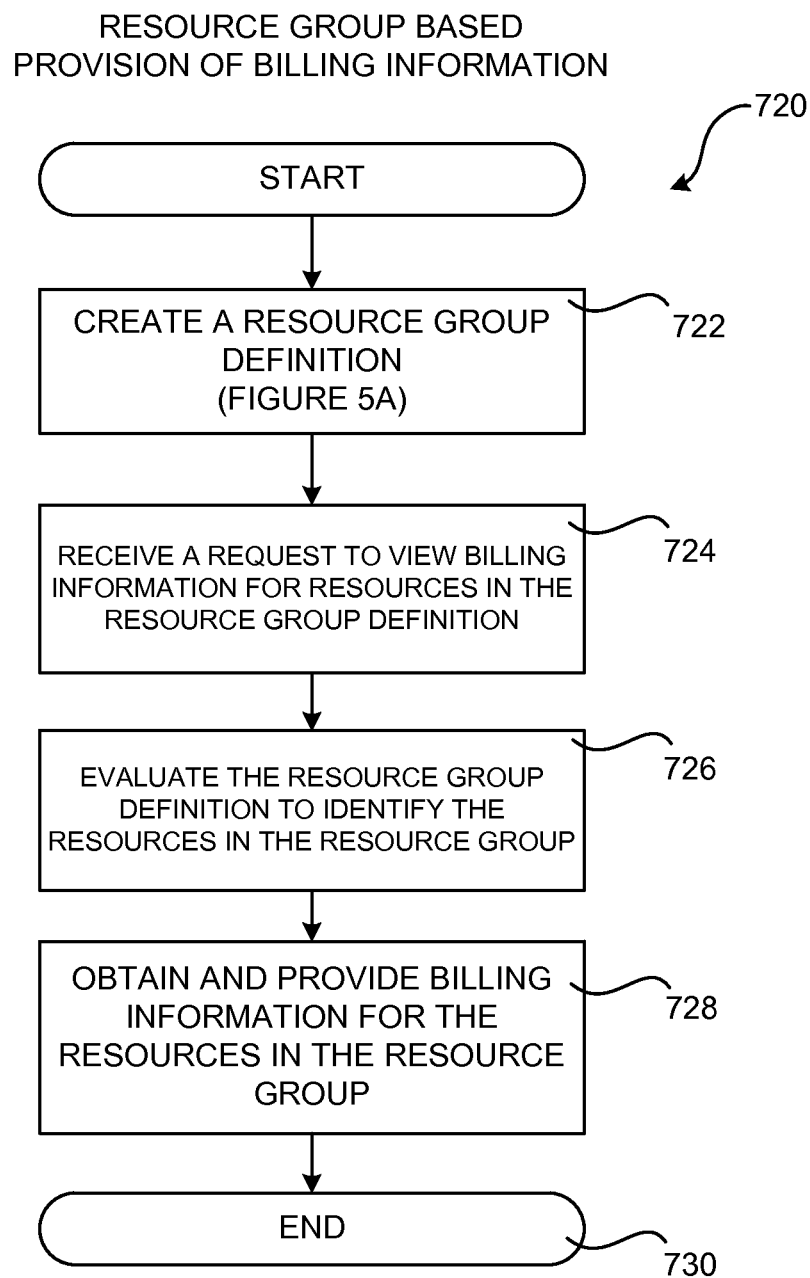

FIG. 7B is a flow diagram showing an illustrative routine 720 for resource group based processing of billing information. The routine 720 begins at operation 722, where a resource group definition 404 might be created using the GUI 408 in the manner described above. Other mechanisms, such as the API 410, might also be utilized to create a new resource group definition 404 and to store the resource group definition 404 in the resource group data store 406.

From operation 722, the routine 720 proceeds to operation 724, where a request is received to view billing information for the resources 108 in the resource group represented by the resource group definition 404 created at operation 722. For example, an appropriate GUI might be provided through which a user can submit such a request. In response to such a request, the routine 722 proceeds from operation 724 to operation 726.

At operation 726, the resource group definition 404 is evaluated in the manner described above in order to identify the specific resources 108 that are in the resource group represented by the resource group definition 404. Once the members of the resource group have been identified, the routine 720 proceeds to operation 728, where billing information for the resources 108 in the resource group is obtained. For example, service calls might be made to various billing systems (now shown in the FIGS.) in the service provider network 102 in order to obtain the billing information. The billing information might indicate, for example, the cost to the customer for operating the computing resources 108 during a particular period of time (e.g. hour/day/week/month/year). The billing information might then be provided to the user in a GUI or as a file (e.g. an XML file or a spreadsheet). The routine 720 then proceeds from operation 728 to operation 730, where it ends.

Figure 7C:
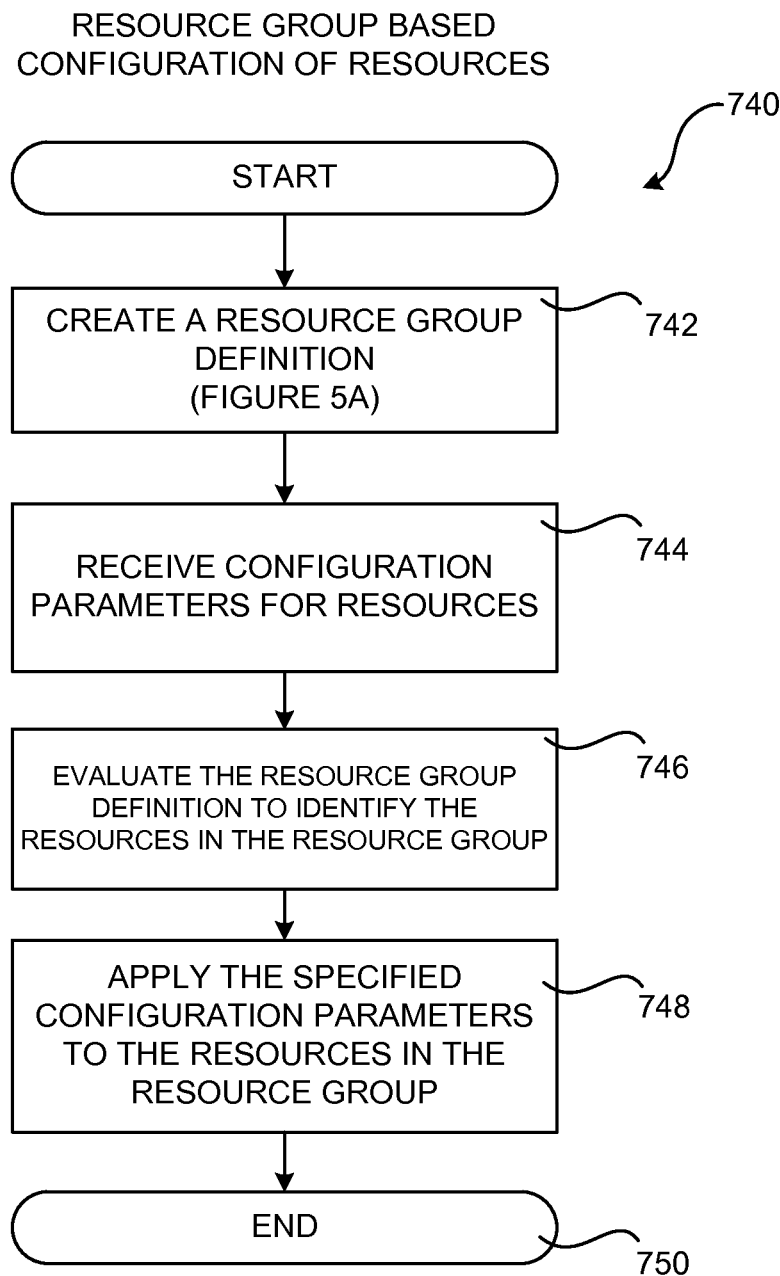

FIG. 7C is a flow diagram showing an illustrative routine 740 for resource group based configuration of computing resources 108. The routine 740 begins at operation 742, where a resource group definition 404 might be created using the GUI 408 in the manner described above. Other mechanisms, such as the API 410, might also be utilized to create a new resource group definition 404 and to store the resource group definition 404 in the resource group data store 406.

From operation 742, the routine 740 proceeds to operation 744, where one or more configuration parameters for the resources 108 in a resource group may be received. An appropriate GUI or other mechanism might be provided through which a user can specify the configuration parameters. The routine 740 then proceeds from operation 744 to operation 746.

At operation 746, the resource group definition 404 is evaluated in the manner described above in order to identify the specific resources 108 that are in the resource group represented by the resource group definition 404. Once the members of the resource group have been identified, the routine 740 proceeds to operation 748, where the configuration parameters specified at operation 724 are applied to the resources 108 in the resource group. Various services within the service provider network 102 might be utilized in order to apply the configuration parameters to the computing resources 108 in the resource group. From operation 748, the routine 740 proceeds to operation 750, where it ends.

It should be appreciated that the operations described above with regard to FIGS. 7A-7C are merely illustrative and that other operations might be performed on the members of a resource group. For example, and without limitations, the resources 108 in a resource group might be controlled (e.g. started, stopped, restarted, shut down), policies might be set for the resources 108 in a resource group, and other types of information about the operation of resources 108 in a resource group might be provided. Other types of operations might also be performed.

As discussed briefly above, the resource tagging service 110 and the resource groups service 402 together can enable various types of functionality. For example, and without limitation, the resource groups service 402, or another component, can be configured to evaluate the membership of a resource group over time. For example, a resource group definition 404 can be evaluated at two or more different points in time to identify the resources 108 that are members of the resource group. The membership of the resource group over time can then be analyzed to generate one or more inferences. For example, and without limitation, inferences may be made regarding the quantity of computing resources 108 in the resource group over time, the type of resources 108 in the resource group over time, the proportions of different resources 108 in the resource group of time, and/or others. Other characteristics of resources in a resource group, such as inventory and usage, might also be evaluated over time and utilized in the manner herein.

In some configurations, various types of metrics are obtained for the resources 108 in a resource group over time. The metrics might include, but are not limited to, inventory, operational cost, operational status, configuration status, and/or other types of metrics indicating the status, condition, or cost of a computing resource 108. Various types of inferences can than also be made based upon the metrics for the resources 108 in the resource group over time. It should also be appreciated that the metrics described above might be obtained and inferences made at a single point in time in some configurations.

Figure 8:
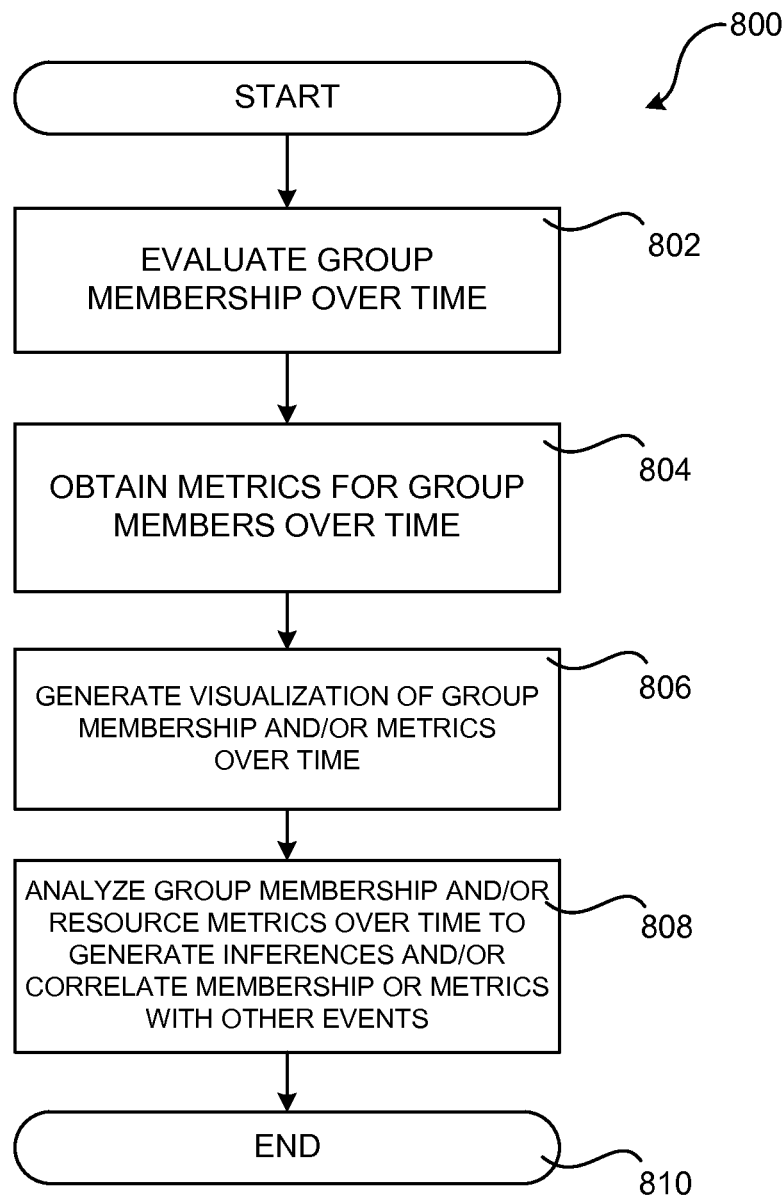
FIG. 8 is a flow diagram showing aspects of an illustrative routine disclosed herein for evaluation of resource group membership and resource metrics over time and for generating inferences therefrom.

In some configurations, the membership of a resource group over time and/or the metrics for the computing resources that are members of a resource group over time might be correlated with events occurring in the service provider network 102. In some configurations, a visualization might also be generated that shows the computing resources 108 that are members of a resource group over time. A visualization might also be generated that shows the metrics for computing resources that are members of a resource group over time. Additionally, a log might be generated that includes data identifying the computing resources in a resource group at two or more points in time. FIG. 8 provides additional details regarding these aspects of the disclosure made herein.

It should be appreciated that other types of actions might also be performed based upon the determined membership or other metrics or characteristics of a resource group over time. For example, and without limitation, alarms might be set or notifications generated based on the membership or other metrics of a resource group over time. Other types of actions might also be taken in other configurations.

FIG. 8 is a flow diagram showing aspects of an illustrative routine 800 disclosed herein for evaluation of resource group membership and resource metrics over time and for generating inferences therefrom. The routine 800 begins at operation 802, where the membership of a resource group is evaluated over time. For example, and without limitation, functionality provided by the resource groups service 402 can be utilized to determine the computing resources 108 that are members of a resource group at two or more points in time.

From operation 802, the routine 800 proceeds to operation 804, where various types of metrics are obtained for the members of the resource group identified at operation 802. The metrics are obtained at or around the time that group membership is evaluated. In this way, both the membership of a resource group and metrics associated with the members can be obtained. As discussed briefly above, the metrics can include, but are not limited to, operational cost, operational status, configuration status, and/or other types of metrics indicating the status, condition, or cost of a computing resource 108. Other types of metrics might also be obtained for the members of a resource group over time.

From operation 804, the routine 800 proceeds to operation 806, where a visualization might be generated that shows the computing resources 108 that are members of a resource group over time. A visualization might also be generated that shows the metrics for computing resources that are members of a resource group over time. Other types of visualizations might also be generated and presented. As discussed above, a log might also be generated that includes data identifying the computing resources in a resource group at two or more points in time.

From operation 806, the routine 800 proceeds to operation 808, where the membership of a resource group over time is analyzed to generate one or more inferences. For example, and without limitation, inferences may be made regarding the quantity of computing resources 108 in the resource group over time, the type of resources 108 in the resource group over time, the proportions of different resources 108 in the resource group of time, and/or others. Inferences can than also be made based upon the metrics obtained at operation 804 for the resources 108 in the resource group over time. In some configurations, the membership of a resource group over time and/or the metrics for the computing resources that are members of a resource group over time might be correlated with events occurring in the service provider network 102. Suggestions might then be made and provided to customers for optimizing the operation of their instances based upon the inferences made at operation 808. From operation 808, the routine 800 proceeds to operation 810, where it ends.

Figure 9:
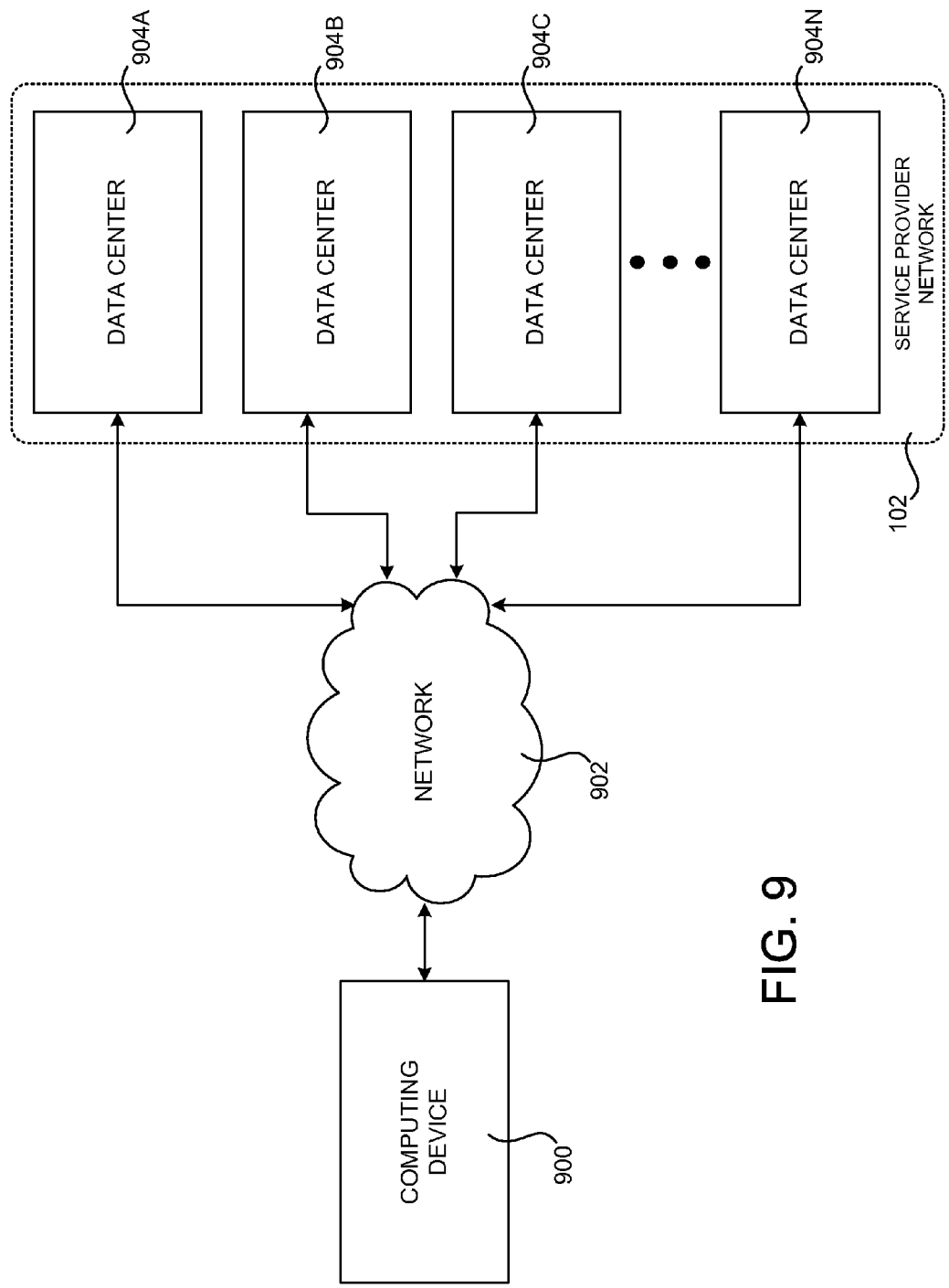
FIG. 9 is a system and network diagram that shows an illustrative operating environment that includes a service provider network that may be configured to implement aspects of the functionality described herein.

FIG. 9 is a system and network diagram that shows one illustrative operating environment for the configurations disclosed herein that includes a service provider network 102 that may be configured to provide the resource tagging service 110, the resource groups service 402, and related functionality in the manner described above, according to one configuration disclosed herein. As discussed above, the service provider network 102 can provide the computing resources 108 on a permanent or an as-needed basis. Among other types of functionality, the computing resources 108 provided by the service provider network 102 can be utilized to execute the various services described above. As also discussed above, the computing resources 108 provided by the service provider network 102 may include various types of computing resources, such as data processing resources, data storage resources, networking resources, data communication resources, network services, and the like.

Each type of computing resource 108 provided by the service provider network 102 may be general-purpose or may be available in a number of specific configurations. For example, data processing resources may be available as physical computers or virtual machine instances in a number of different configurations. The virtual machine instances may be configured to execute applications, including Web servers, application servers, media servers, database servers, some or all of the services described above, and/or other types of programs. Data storage resources may include file storage devices, block storage devices, and the like. The service provider network 102 might also be configured to provide other types of computing resources 108.

The computing resources 108 provided by the service provider network 102 are enabled in one implementation by one or more data centers 904A-904N (which may be referred herein singularly as "a data center 904" or in the plural as "the data centers 904"). The data centers 904 are facilities utilized to house and operate computer systems and associated components. The data centers 904 typically include redundant and backup power, communications, cooling, and security systems. The data centers 904 might also be located in geographically disparate locations. One illustrative configuration for a data center 904 that implements some of the technologies disclosed herein for providing the resource tagging service 110, the resource groups service 402, and related functionality will be described below with regard to FIG. 10.

The customers and other users of the service provider network 102 may access the computing resources 108 provided by the service provider network 102 over a network 902, which may be a wide area communication network ("WAN"), such as the Internet, an intranet or an Internet service provider ("ISP") network or a combination of such networks. For example, and without limitation, a computing device 900 operated by a customer or other user of the service provider network 102 might be utilized to access the service provider network 102 by way of the network 902. It should be appreciated that a local-area network ("LAN"), the Internet, or any other networking topology known in the art that connects the data centers 904 to remote customers and other users may be utilized. It should also be appreciated that combinations of such networks might also be utilized.

Figure 10:
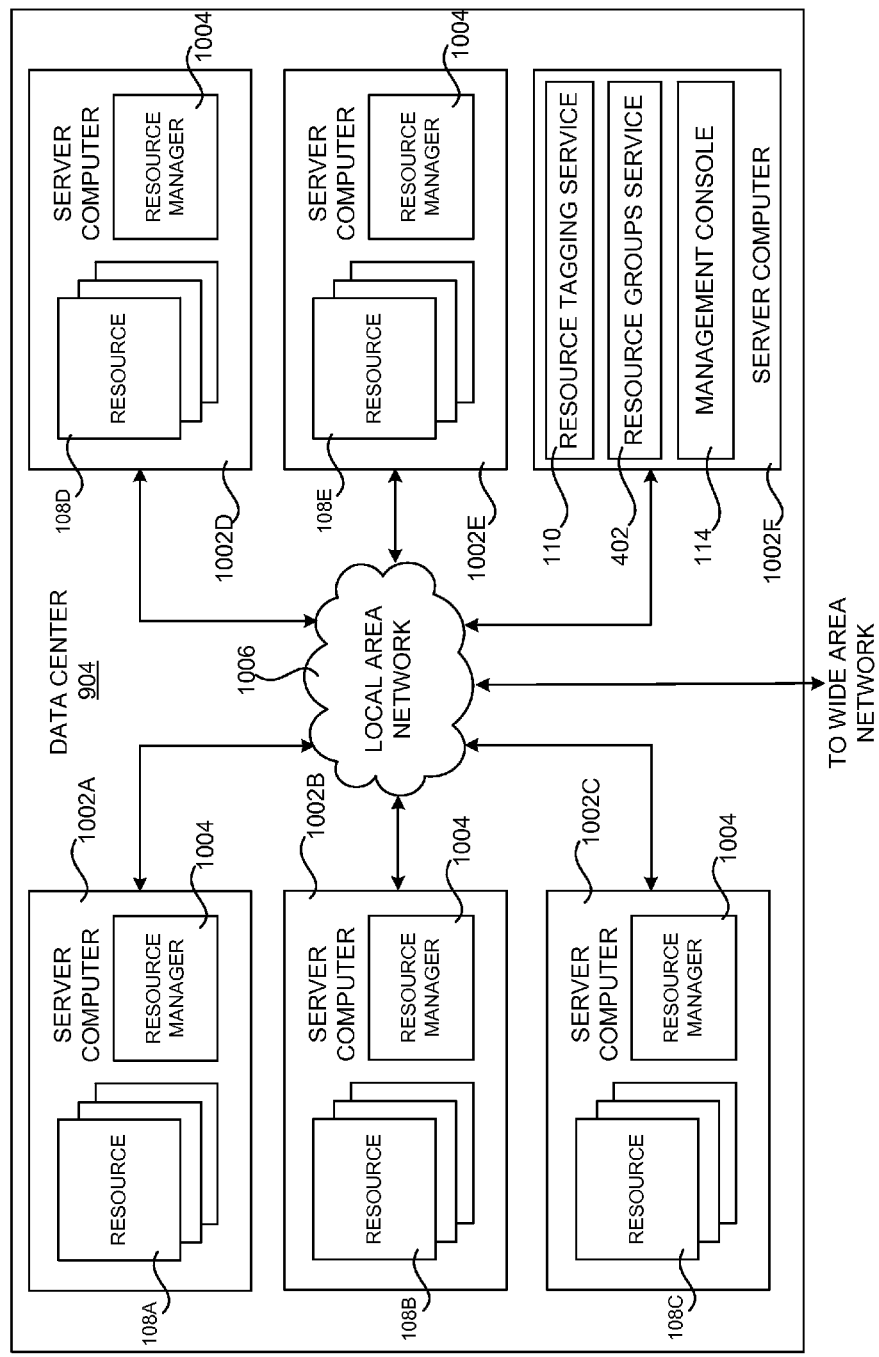
FIG. 10 is a computing system diagram illustrating a configuration for a data center that may be utilized to implement aspects of the technologies disclosed herein.

FIG. 10 is a computing system diagram that illustrates one configuration for a data center 904 that implements aspects of the technologies disclosed herein for providing the resource tagging service 110, the resource groups service 402, and the related functionality disclosed herein. The example data center 904 shown in FIG. 10 includes several server computers 1002A-1002F (which may be referred to herein singularly as "a server computer 1002" or in the plural as "the server computers 1002") for providing computing resources 108A-108E.

The server computers 1002 may be standard tower, rack-mount, or blade server computers configured appropriately for providing the computing resources described herein. As mentioned above, the computing resources 108 might be data processing resources such as virtual machine instances or hardware computing systems, data storage resources, database resources, networking resources, and others. Some of the servers 1002 might also be configured to execute a resource manager 1004 capable of instantiating and/or managing the computing resources 108. In the case of virtual machine instances, for example, the resource manager 1004 might be a hypervisor or another type of program configured to enable the execution of multiple virtual machine instances on a single server 1002. Server computers 1002 in the data center 904 might also be configured to provide network services and other types of services, some of which are described in detail below with regard to FIG. 11.

The data center 904 shown in FIG. 10 also includes a server computer 1002F that may execute some or all of the software components described above. For example, and without limitation, the server computer 1002F might be configured to execute the one or more of the resource tagging service 110, the resource groups service 402, and/or the management console 114, each of which has been described in detail above. The server computer 1002F might also be configured to execute other components and/or to store data for providing some or all of the functionality described herein. In this regard, it should be appreciated that the services illustrated in FIG. 10 as executing on the server computer 1002F might execute on many other physical or virtual servers in the data centers 904 in various configurations.

In the example data center 904 shown in FIG. 10, an appropriate LAN 1006 is also utilized to interconnect the server computers 1002A-1002F. The LAN 1006 is also connected to the network 902 illustrated in FIG. 9. It should be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components might also be utilized for balancing a load between each of the data centers 904A-904N, between each of the server computers 1002A-1002F in each data center 904, and, potentially, between computing resources 108 in each of the data centers 904. It should be appreciated that the configuration of the data center 904 described with reference to FIG. 10 is merely illustrative and that other implementations might be utilized.

Figure 11:
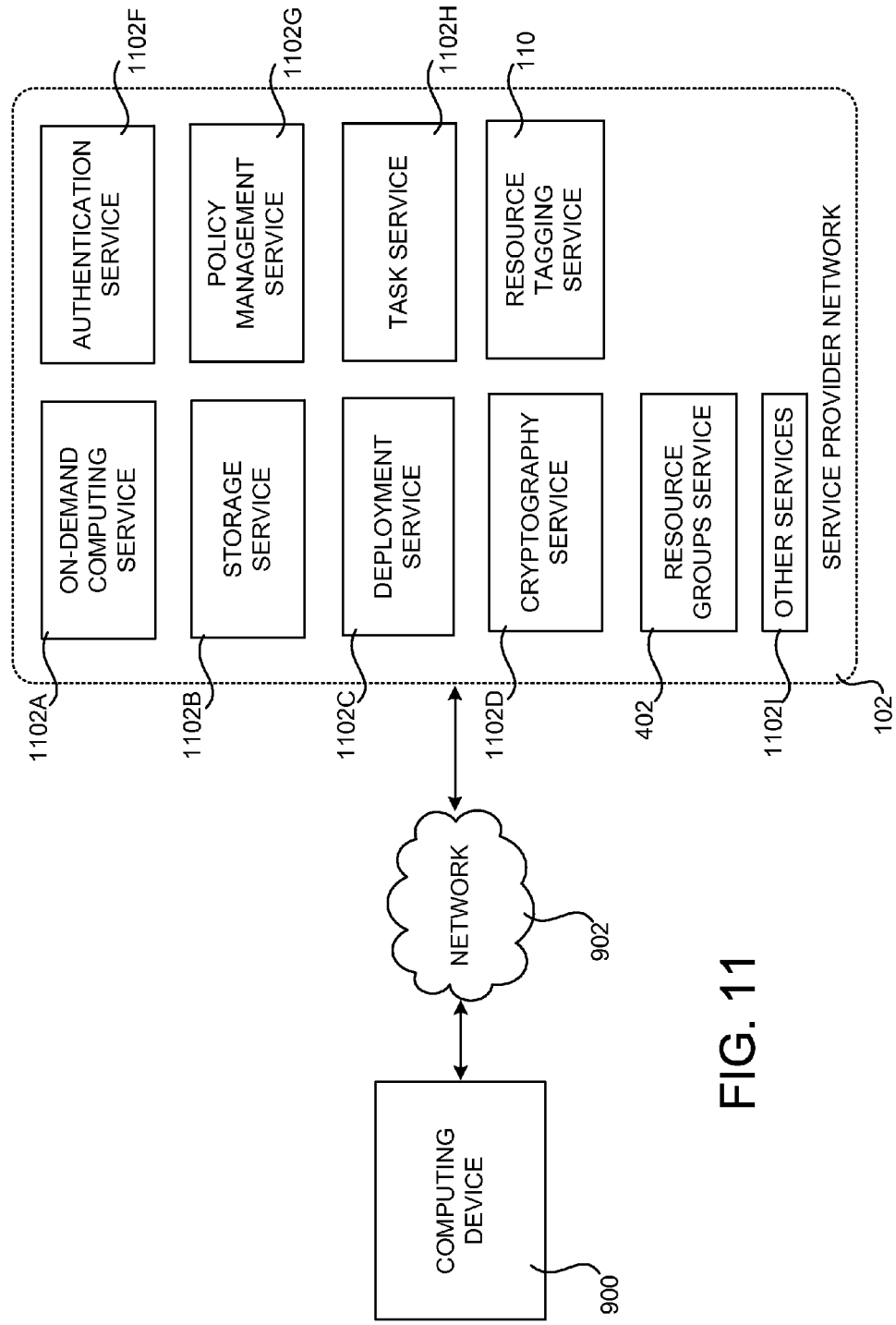
FIG. 11 is a system and network diagram that shows aspects of several services that might be provided by and utilized within a service provider network in one configuration disclosed herein.

FIG. 11 is a system and network diagram that shows aspects of several network services that might be provided by and utilized within a service provider network 102 in one configuration disclosed herein. In particular, and as discussed briefly above, the service provider network 102 may provide a variety of network services to customers and other users of the service provider network 102 including, but not limited to, an on-demand computing service 1102A, a storage service 1102B, a deployment service 1102C, a cryptography service 1102D, an authentication service 1102F, a policy management service 1102G, and/or a task service 1102H, each of which is described in greater detail below. Additionally, the service provider network 102 might also provide the resource tagging service 110 and the resource groups service 402, each of which was described in detail above. The service provider network 102 might also provide other services 1102I, some of which are described in greater detail below. As discussed above, the services shown in FIG. 11 may provide various types of computing resources 108, which may be tagged and grouped in the manner described herein.

It should be appreciated that customers of the service provider network 102 may include organizations or individuals that utilize some or all of the services provided by the service provider network 102. As shown in FIG. 11, a customer or other user may communicate with the service provider network 102 through the network 902. Communications from the computing device 900 to the service provider network 102 may cause the services provided by the service provider network 102 to operate in accordance with the described configurations or variations thereof.

It is noted that not all configurations described include the services described with reference to FIG. 11 and that additional services may be provided in addition to or as an alternative to services explicitly described. Each of the services shown in FIG. 11 might also expose Web service interfaces that enable a caller to submit appropriately configured API calls to the various services through web service requests. In addition, each of the services may include service interfaces that enable the services to access each other (e.g., to enable a virtual computer system provided by the on-demand computing service 1102A to store data in or retrieve data from the data storage service 1102B). Additional details regarding some of the services shown in FIG. 11 will now be provided.

The on-demand computing service 1102A may be a collection of computing resources 108 configured to instantiate virtual machine instances. For example, a customer or other user of the service provider network 1102A may interact with the on-demand computing service 1102A (via appropriately configured and authenticated API calls) to provision and operate virtual computer systems that are instantiated on physical computing devices hosted and operated by the service provider network 102. The virtual computer systems may be used for various purposes, such as to operate as servers supporting a Web site, to operate business applications or, generally, to serve as computing resources 108 for the customer. Other applications for the virtual computer systems may be to support database applications, electronic commerce applications, business applications and/or other applications. Although the on-demand computing service 1102A is shown in FIG. 11, any other computer system or computer system service may be utilized in the service provider network 102, such as a computer system or computer system service that does not employ virtualization and instead provisions computing resources 108 on dedicated or shared computers/servers and/or other physical devices.

In some configurations, the on-demand computing service 1102A is configured to provide clusters of computing resources 108. For example, and without limitation, the on-demand computing service 1102A might provide clusters of virtual or physical hosts for executing services such as those described above. According to one configuration, computing clusters provided by the on-demand computing service 1102A might be organized as an APACHE™ HADOOP® computing cluster specialized for deployment alongside, or within, the service provider network 102. It should be appreciated that other variations and implementations of computing clusters are possible. Thus, the present disclosure should not be limited to only these examples, but should be interpreted as including any equivalent variations as well.

The storage service 1102B might include software and computing resources 108 that collectively operate to store data using block or file-level storage devices (and/or virtualizations thereof). The storage devices of the storage service 1102B might, for instance, be operationally attached to virtual computer systems provided by the on-demand computing service 1102A to serve as logical units (e.g., virtual drives) for the computer systems. A storage device might also enable the persistent storage of data used/generated by a corresponding virtual computer system where the virtual computer system service might only provide ephemeral data storage.

The service provider network 102 may also include a cryptography service 1102D. The cryptography service 1102D may utilize storage services of the service provider network 102, such as the storage service 1102B, to store encryption keys in encrypted form, whereby the keys may be usable to decrypt customer keys accessible only to particular devices of the cryptography service 1102D. The cryptography service 1102D might also provide other types of functionality not specifically mentioned herein.

As illustrated in FIG. 11, the service provider network 102, in various configurations, also includes an authentication service 1102F and a policy management service 1102G. The authentication service 1102F, in one example, is a computer system (i.e., collection of computing resources 108) configured to perform operations involved in authentication of users. For instance, one of the services 1102 shown in FIG. 11 may provide information from a user to the authentication service 1102F to receive information in return that indicates whether or not the requests submitted by the user are authentic.

The policy management service 1102G, in one example, is a network service configured to manage policies on behalf of customers or internal users of the service provider network 102. The policy management service 1102G may include an interface that enables customers to submit requests related to the management of policy. Such requests may, for instance, be requests to add, delete, change or otherwise modify policy for a customer, service, or system, or for other administrative actions, such as providing an inventory of existing policies and the like.

The service provider network 102, in various configurations, is also configured with a task service 1102H. The task service 1102H is configured to receive a task package and to enable executing tasks as dictated by the task package. The task service 1102H may be configured to use any resource 108 of the service provider network 102, such as instantiated virtual machines or virtual hosts, for executing the task. The task service 1102H may configure the instantiated virtual machines or virtual hosts to operate using a selected operating system and/or a selected execution application in accordance with specified requirements.

The service provider network 102 may additionally maintain other services 1102 based, at least in part, on the needs of its customers. For instance, the service provider network 102 may maintain a deployment service 1102C for deploying program code and/or a database service (not shown in FIG. 11) in some configurations. A database service may be a collection of computing resources 108 that collectively operate to create, maintain, and allow queries to be performed on databases stored within the service provider network 102. For example, a customer or other user of the service provider network 102 may operate and manage a database from the database service by utilizing appropriately configured network API calls. This, in turn, may allow the customer to maintain and potentially scale the operations in the database. Other services include object-level archival data storage services, and services that manage, monitor, interact with, or support other services. The service provider network 102 might also be configured with other services not specifically mentioned herein in other configurations.

Figure 12:
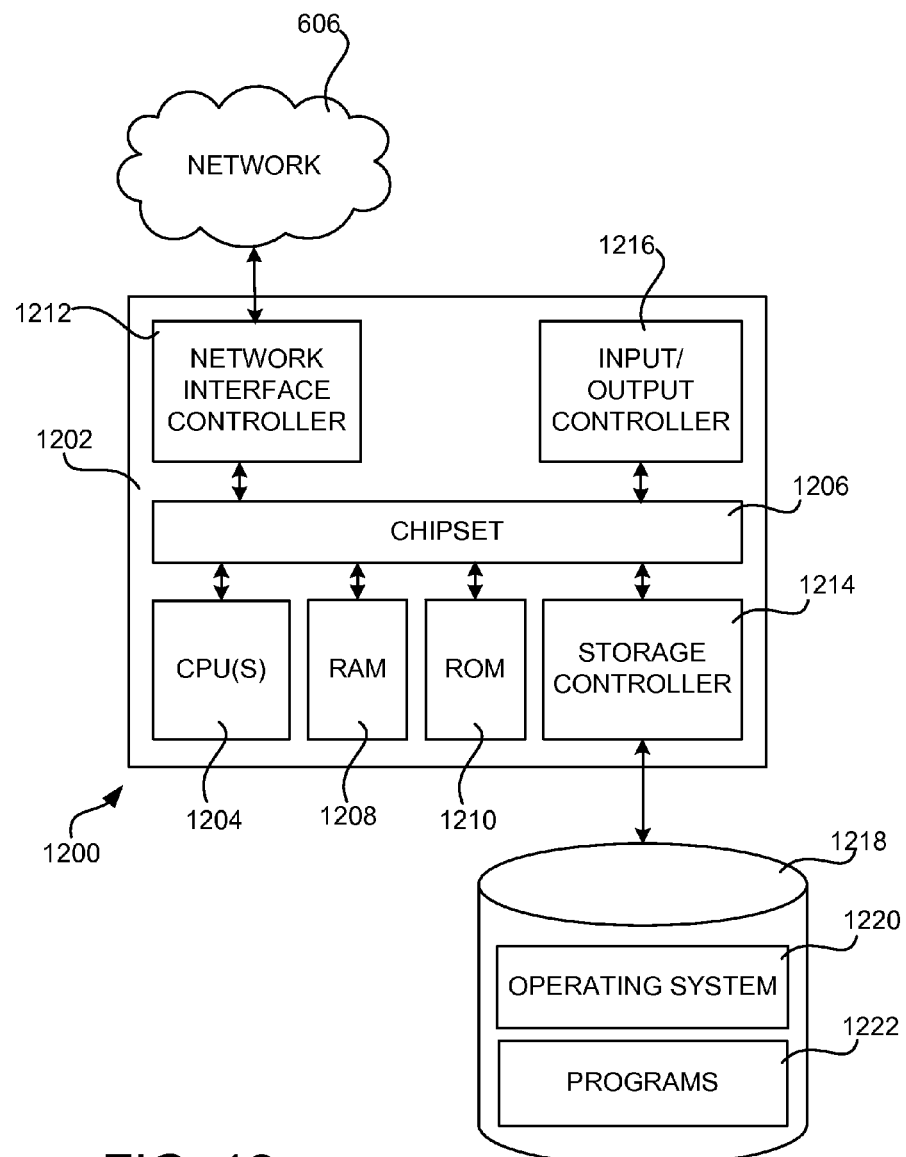
FIG. 12 is a computer architecture diagram showing an illustrative computer hardware architecture for implementing a computing device that might be utilized to implement aspects of the various technologies presented herein.

FIG. 12 shows an example computer architecture for a computer 1200 capable of executing program components for implementing various aspects of the functionality described above. The computer architecture shown in FIG. 12 illustrates a conventional server computer, workstation, desktop computer, laptop, tablet, network appliance, e-reader, smartphone, or other computing device, and may be utilized to execute any of the software components presented herein. For example, the computer architecture shown in FIG. 12 may be utilized to execute software components for providing the resource tagging service 110 and/or the resource groups service 402 in the manner described above.

The computer 1200 includes a baseboard 1202, or "motherboard," which is a printed circuit board to which a multitude of components or devices may be connected by way of a system bus or other electrical communication paths. In one illustrative configuration, one or more central processing units ("CPUs") 1204 operate in conjunction with a chipset 1206. The CPUs 1204 may be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 may provide an interface to a RAM 1208, used as the main memory in the computer 1200. The chipset 1206 may further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM may also store other software components necessary for the operation of the computer 1200 in accordance with the configurations described herein.

The computer 1200 may operate in a networked environment using logical connections to remote computing devices and computer systems through a network, such as the network 606. The chipset 1206 may include functionality for providing network connectivity through a NIC 1212, such as a gigabit Ethernet adapter. The NIC 1212 is capable of connecting the computer 1200 to other computing devices over the network 606. It should be appreciated that multiple NICs 1212 may be present in the computer 1200, connecting the computer to other types of networks and remote computer systems.

The computer 1200 may be connected to a mass storage device 1218 that provides non-volatile storage for the computer. The mass storage device 1218 may store an operating system 1220, programs 1222, and data, which have been described in greater detail herein. The mass storage device 1218 may be connected to the computer 1200 through a storage controller 1214 connected to the chipset 1206. The mass storage device 1218 may consist of one or more physical storage units. The storage controller 1214 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1200 may store data on the mass storage device 1218 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1218 is characterized as primary or secondary storage, and the like.

For example, the computer 1200 may store information to the mass storage device 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 may further read information from the mass storage device 1218 by detecting the physical states or characteristics of one or more particular locations within the physical storage units.

In addition to the mass storage device 1218 described above, the computer 1200 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 1200.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1218 may store an operating system 1220 utilized to control the operation of the computer 1200. According to one configuration, the operating system comprises the LINUX operating system. According to another configuration, the operating system comprises the WINDOWS® SERVER operating system from MICROSOFT Corporation. According to further configurations, the operating system may comprise the UNIX operating system or one of its variants. It should be appreciated that other operating systems may also be utilized. The mass storage device 1218 may store other system or application programs and data utilized by the computer 1200.

In one configuration, the mass storage device 1218 or other computer-readable storage media is encoded with computer-executable instructions which, when loaded into the computer 1200, transform the computer from a general-purpose computing system into a special-purpose computer capable of implementing the configurations described herein. These computer-executable instructions transform the computer 1200 by specifying how the CPUs 1204 transition between states, as described above. According to one configuration, the computer 1200 has access to computer-readable storage media storing computer-executable instructions which, when executed by the computer 1200, perform the various processes described above with regard to FIGS. 3, 6, 7A-7C and 8. The computer 1200 might also include computer-readable storage media for performing any of the other computer-implemented operations described herein.

The computer 1200 may also include one or more input/output controllers 1216 for receiving and processing input from a number of input devices, such as a keyboard, a mouse, a touchpad, a touch screen, an electronic stylus, or other type of input device. Similarly, an input/output controller 1216 may provide output to a display, such as a computer monitor, a flat-panel display, a digital projector, a printer, a plotter, or other type of output device. It will be appreciated that the computer 1200 may not include all of the components shown in FIG. 12, may include other components that are not explicitly shown in FIG. 12, or may utilize an architecture completely different than that shown in FIG. 12.

Based on the foregoing, it should be appreciated that technologies for providing a resource tagging service, a resource groups service, and for providing related functionality have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. An apparatus, comprising:
   a processor; and
   a non-transitory computer-readable storage medium having instructions stored thereupon which are executable by the processor and which, when executed, cause the apparatus to
   expose through a Web services application programming interface (API) functionality to identify and modify computing resources located in a service provider network remotely from the apparatus;
   display within a management console a definition user interface including elements for specifying characteristics of a resource group among the computing resources, the elements including a group name, a geographical region, a resource type, and at least one of a resource tag key and a resource tag value;
   receive via the API selections for the elements;
   save a logical expression of the elements as a resource group definition;
   convert the resource group definition to a uniform resource locator (URL) to be shared with users of the service provider network;
   receive a request comprising one or more configuration parameters to apply on one or more of the computing resources in the resource group,
   evaluate the resource group definition in order to identify the one or more resources in the resource group, and
   configure the identified resources in the resource group according to the configuration parameters.

2. The apparatus of claim 1, further comprising applying one or more access rights to the identified resources in the resource group or applying one or more access rights to the identified resources to one or more user accounts.

3. The apparatus of claim 1, further comprising obtaining billing information for the identified resources in the resource group.

4. The apparatus of claim 1, wherein the instructions, when executed, further cause the apparatus to:
   display within the management console a searching user interface including fields for identifying characteristics among the computing resources, the fields including at least geographical region and resource type,
   search for qualifying computing resources within the service provider network having at least the desired characteristics, and
   display within the management console a list of the qualifying computing resources and at least the desired characteristics.

5. The apparatus of claim 4, wherein the instructions, when executed, further cause the apparatus to:
   based at least in part on the display of the list of the qualifying computing resources, receive via the API a selection of one or more of the qualifying computing resources;
   display within the management console a tagging user interface including fields for choosing at least one resource tag for the selected computing resources, individual ones of the resource tags comprising a tag key and a tag value for the tag key;
   receive via the API a choice for the at least one resource tag; and
   associate the chosen at least one resource tag with the selected computing resources.

6. The apparatus of claim 5, wherein the display within the management console a tagging user interface further comprises:

receive input on the management console corresponding to a cursor hovering over the field for choosing the tag value for the at least one resource tag; and at least in part based on the input, display a list of multiple options for the tag value available for the at least one resource tag.

7. A non-transitory computer-readable storage medium having computer-executable instructions stored thereupon which, when executed by a computer, cause the computer to:

expose through a Web services application programming interface (API) functionality to identify and modify computing resources located in a service provider network remotely from the apparatus;

display within a management console a definition user interface including elements for specifying characteristics of a resource group among the computing resources, the elements including a group name, a geographical region, a resource type, and at least one of a resource tag key and a resource tag value;

receive via the API selections for the elements;

save a logical expression of the elements as a resource group definition;

convert the resource group definition to a uniform resource locator (URL) to be shared with users of the service provider network;

receive a request comprising one or more configuration parameters to apply on one or more of the computing resources in the resource group;

evaluate the resource group definition in order to identify the one or more computing resources in the resource group; and configure the one or more computing resources in the resource group according to the configuration parameters.

8. The non-transitory computer-readable storage medium of claim 7, further comprising applying one or more access rights to the computing resources in the resource group or applying one or more access rights to the computing resources in the resource group to one or more user accounts.

9. The non-transitory computer-readable storage medium of claim 7, further comprising obtaining usage information for the computing resources in the resource group.

10. The non-transitory computer-readable storage medium of claim 7, further comprising starting, stopping, or shutting down the computing resources in the resource group.

11. The non-transitory computer-readable storage medium of claim 7, wherein the instructions, when executed, further cause the computer to:

display within the management console a searching user interface including fields for identifying characteristics among the computing resources, the fields including at least geographical region and resource type, search for qualifying computing resources within the service provider network having at least the desired characteristics, and display within the management console a list of the qualifying computing resources and at least the desired characteristics.

12. The non-transitory computer-readable storage medium of claim 11, wherein the instructions, when executed, further cause the computer to:

based at least in part on the display of the list of the qualifying computing resources, receive via the API a selection of one or more of the qualifying computing resources;

display within the management console a tagging user interface including fields for choosing at least one resource tag for the selected computing resources, individual ones of the resource tags comprising a tag key and a tag value for the tag key;

receive via the API a choice for the at least one resource tag; and associate the chosen at least one resource tag with the selected computing resources.

13. The non-transitory computer-readable storage medium of claim 12, wherein the instructions, when executed, further cause the computer to:

receive input on the management console corresponding to a cursor hovering over the field for choosing the tag value for the at least one resource tag; and at least in part based on the input, display a list of multiple options for the tag value available for the at least one resource tag.

14. A computer-implemented method for performing an operation on one or more computing resources in a service provider network, the method comprising:

exposing through a Web services application programming interface (API) functionality to identify and modify computing resources located in a service provider network remotely from the apparatus;

displaying within a management console a definition user interface including elements for specifying characteristics of a resource group among the computing resources, the elements including a group name, a geographical region, a resource type, and at least one of a resource tag key and a resource tag value;

receiving via the API selections for the elements;

saving a logical expression of the elements as a resource group definition;

converting the resource group definition to a uniform resource locator (URL) to be shared with users of the service provider network;

receiving a request comprising one or more configuration parameters to apply on one or more of the computing resources in the resource group;

evaluating the resource group definition in order to identify the one or more computing resources in the resource group; and configuring the one or more computing resources in the resource group according to the configuration parameters.

15. The computer-implemented method of claim 14, wherein a resource groups service executing in the service provider network is configured to evaluate the resource group definition.

16. The computer-implemented method of claim 15, wherein the resource groups service is configured to expose a network service application programming interface (API) for creating, retrieving, updating and deleting the resource group definition.

17. The computer-implemented method of claim 14, further comprising one or more of obtaining billing information for the computing resources in the resource group, obtaining usage information for the computing resources in the resource group, applying one or more access rights to the computing resources in the resource group, or starting, stopping, or shutting down the computing resources in the resource group.

18. The computer-implemented method of claim 14, further comprising:

displaying within the management console a searching user interface including fields for identifying characteristics among the computing resources, the fields including at least geographical region and resource type, searching for qualifying computing resources within the service provider network having at least the desired characteristics, and displaying within the management console a list of the qualifying computing resources and at least the desired characteristics.

19. The computer-implemented method of claim 18, further comprising:

based at least in part on the display of the list of the qualifying computing resources, receiving via the API a selection of one or more of the qualifying computing resources;

displaying within the management console a tagging user interface including fields for choosing at least one resource tag for the selected computing resources, individual ones of the resource tags comprising a tag key and a tag value for the tag key;

receiving via the API a choice for the at least one resource tag; and associating the chosen at least one resource tag with the selected computing resources.

20. The computer-implemented method of claim 19, further comprising:

receiving input on the management console corresponding to a cursor hovering over the field for choosing the tag value for the at least one resource tag; and at least in part based on the input, displaying a list of multiple options for the tag value available for the at least one resource tag.

\* \* \* \* \*